United States Patent
Pringle et al.

(10) Patent No.: US 6,470,306 B1
(45) Date of Patent: Oct. 22, 2002

(54) AUTOMATED TRANSLATION OF ANNOTATED TEXT BASED ON THE DETERMINATION OF LOCATIONS FOR INSERTING ANNOTATION TOKENS AND LINKED ENDING, END-OF-SENTENCE OR LANGUAGE TOKENS

(75) Inventors: Lewis G. Pringle, Subbury, MA (US); Robert W. Swerdlow, Falmouth, ME (US); Alec Wysoker, Cambridge, MA (US)

(73) Assignee: LogoVista Corporation

( * ) Notice: Subject to any disclaimer, the term of this patent is extended or adjusted under 35 U.S.C. 154(b) by 0 days.

(21) Appl. No.: 09/202,013

(22) PCT Filed: Jun. 9, 1997

(86) PCT No.: PCT/US97/10005

§ 371 (c)(1),
(2), (4) Date: Jun. 14, 1999

(87) PCT Pub. No.: WO97/48058

PCT Pub. Date: Dec. 18, 1997

Related U.S. Application Data

(63) Continuation-in-part of application No. PCT/US96/05567, filed on Apr. 23, 1996, and a continuation-in-part of application No. PCT/US96/10283, filed on Jun. 14, 1996.

(51) Int. Cl.[7] ............................................. G06F 17/28
(52) U.S. Cl. .................... 704/3; 704/7; 704/8; 707/536
(58) Field of Search .......................... 704/2, 3, 7, 4, 704/5, 6, 8, 9, 10; 707/536, 532, 513, 501

(56) References Cited

U.S. PATENT DOCUMENTS

| | | | |
|---|---|---|---|
| 4,791,587 A | 12/1988 | Doi | 704/2 |
| 4,805,100 A | 2/1989 | Ozeki | 704/1 |
| 4,833,611 A | 5/1989 | Fukumochi et al. | 704/5 |
| 4,868,750 A * | 9/1989 | Kucera et al. | 704/8 |
| 4,916,614 A | 4/1990 | Kaji et al. | 704/2 |

(List continued on next page.)

FOREIGN PATENT DOCUMENTS

| | | |
|---|---|---|
| EP | 0357344 | 8/1989 |
| WO | WO 97/18516 | 5/1997 |

OTHER PUBLICATIONS

Stanley, Y.W. SU, "Heuristic Algorithms For Path Determination In A Semantic Network", IEEE Cat. No. 0730–3157/90/0000/0587, 1990, pp. 587–592.

Spiegel, M.R., "Theory And Problems Of Probability And Statistics", Schaum's Outline Series, Chapter 3, p. 76.

(List continued on next page.)

*Primary Examiner*—Joseph Thomas
(74) *Attorney, Agent, or Firm*—Daly, Crowley & Mofford, LLP

(57) ABSTRACT

A system and method for translating an annotated source document in a first natural language to a target document in a second natural language having corresponding annotations, includes computer storage, a computer receiving module for receiving input textual information in a first language and for storing the input textual information in the computer storage, the input textual information including annotations and a translation engine for creating a first token string including first language tokens, annotation tokens that apply to the first language tokens, and ending tokens. Prior to translation, the annotation tokens are removed from the first token string and a plurality of annotation records are created for the first language tokens, each annotation record linking one of the first language tokens to each of the annotation tokens that apply to the first language token. After the first language tokens have been translated into second language tokens, the annotation tokens are inserted at appropriate locations in the second token string. These locations are determined using the end-of-sentence tokens and the annotation records, and a target document is produced in the second language using the second token string and annotations, thus recreating in the target document, the annotations of the source document.

35 Claims, 18 Drawing Sheets

U.S. PATENT DOCUMENTS

| | | | | |
|---|---|---|---|---|
| 4,958,285 | A | | 9/1990 | Tominaga ........................ 704/8 |
| 4,964,044 | A | | 10/1990 | Kumano et al. ................ 704/5 |
| 4,980,829 | A | | 12/1990 | Okajima et al. ............... 704/5 |
| 4,984,178 | A | | 1/1991 | Hemphill .................... 704/255 |
| 5,029,085 | A | | 7/1991 | Ito ................................. 704/9 |
| 5,060,155 | A | | 10/1991 | van Zuijlen .................... 704/9 |
| 5,136,503 | A | | 8/1992 | Takagi et al. ................... 704/2 |
| 5,214,583 | A | | 5/1993 | Miike et al. .................... 704/4 |
| 5,243,520 | A | | 9/1993 | Jacobs et al. ................... 704/9 |
| 5,321,607 | A | | 6/1994 | Fukumochi et al. ........... 704/4 |
| 5,448,474 | A | | 9/1995 | Zamora .......................... 704/9 |
| 5,497,319 | A | | 3/1996 | Chong et al. ................... 704/2 |
| 5,528,491 | A | | 6/1996 | Kuno et al. ..................... 704/9 |
| 5,587,902 | A | | 12/1996 | Kugimiya ....................... 704/2 |
| 5,848,386 | A | * | 12/1998 | Motoyama ...................... 704/5 |
| 5,890,103 | A | * | 3/1999 | Carus ............................. 704/9 |
| 5,930,746 | A | * | 7/1999 | Ting ............................... 704/9 |
| 5,987,402 | A | * | 11/1999 | Murata et al. .................. 704/2 |

OTHER PUBLICATIONS

Cormen, T.H. et al., Introduction To Algorithms—16–Dynamic Programming, The Mit Press/Mcgraw–Hill Book Company, pp. 301–314.

Gazdar, Gerald, *Natural Language Processing In Prolog—An Introduction—To Computational Linguistics*—7.2 "Feature Structures As Graphs" Addison–Wesley Publishing Company, pp. 221–226.

Sobashima et al., "A Corpus–based Local Context Analysis for Spoken Dialogues", Speech Communications, pp. 205–212.

PCT/US97/10005, International Search Report, 4 pages.

Teller et al. paper, 1994, "A Probabilistic Algorithm for Segmenting Non–Kanji Japanese Strings", Natural Language Processing, pp. 742–747.

Abe et al. paper, 1986, "A Kana–Kanji Translation System for Non–Segmented Input Sentences Based on Syntactic and Sematic Analysis", Central Research Laboratory, Hitachi, Ltd., pp. 280–285.

Database Inspec., Institute of Electrical Engineers, Stevenage, GB, Inspec. No. 5307955 Murata, T., et al., "Realtime Machine Translation System for World Wide Web," XP002043731; and (1 page English Translation only Considered) Transactions of the Institute of Electronics, Information and Communication Engineers B–1, May 1996, Inst. Electron. Inf. & Commun. Eng, Japan, vol. J79B–I, No. 5, ISSN 0915–1877, pp. 364–372.

\* cited by examiner

AUTOMATED TRANSLATION OF ANNOTATED TEXT BASED ON THE DETERMINATION OF LOCATIONS FOR INSERTING ANNOTATION TOKENS AND LINKED ENDING, END-OF-SENTENCE OR LANGUAGE TOKENS

CROSS-REFERENCE TO RELATED APPLICATIONS AND PATENTS

This is a continuation-in-part of international patent application PCT/US96/05567 which was filed with the U.S. Receiving Office on Apr. 23, 1996 via the Patent Cooperation Treaty (PCT) designating Japan and the U.S., and international patent application PCT/US96/10283 which was filed with the U.S. Receiving Office on Jun. 14, 1996 designating Japan and the U.S. Also U.S. Pat. No. 5,528,491 is a related patent, the entire contents of which are hereby incorporated hereinto by reference.

TECHNICAL FIELD

The invention relates to automated natural language translation in which a source document having annotations is translated automatically into another language while preserving the annotations in the translation. For example, an HTML document in English can be automatically translated into an equivalent Japanese language HFTML document to allow a World Wide Web page to be viewed in Japanese while preserving the formatting and hyperlinks present in the original English language version of the page.

BACKGROUND INFORMATION

Various schemes for the machine-based translation of natural language have been proposed. Typically, the system used for translation includes a computer which receives input in one language and performs operations on the received input to supply output in another language. This type of translation has been an inexact one, and the resulting output can require significant editing by a skilled operator. The translation operation performed by known systems generally includes a structural conversion operation. The objective of structural conversion is to transform a given parse tree (i.e., a syntactic structure tree) of the source language sentence to the corresponding tree in the target language. Two types of structural conversion have been tried, grammar-rule-based and template-to-template.

In grammar-rule-based structural conversion, the domain of structural conversion is limited to the domain of grammar rules that have been used to obtain the source-language parse tree (i.e., to a set of subnodes that are immediate daughters of a given node). For example, given > VP=VT01+NP (a VerbPhrase consists of a SingleObject Transitive Verb and a NounPhrase, in that order)

and

> Japanese: 1+2=>2+1 (Reverse the order of VT01 and NP), each source-language parse tree that involves application of the rule is structurally converted in such a way that the order of the verb and the object is reversed because the verb appears to the right of its object in Japanese. This method is very efficient in that it is easy to determine where the specified conversion applies; it applies exactly at the location where the rule has been used to obtain the source-language parse tree. On the other hand, it can be a weak conversion mechanism in that its domain, as specified above, may be extremely limited, and in that natural language may require conversion rules that straddle over nodes that are not siblings.

In template-to-template structural conversion, structural conversion is specified in terms of input/output (I/O) templates or subtrees. If a given input template matches a given structure tree, that portion of the structure tree that is matched by the template is changed as specified by the corresponding output template. This is a very powerful conversion mechanism, but it can be costly in that it can take a long period of time to find out if a given input template matches any portion of a given structure tree.

Conventional systems translate annotations in text, such as part-of-speech settings, i.e. <VERB>, <NOUN>, Hypertext Markup Language (HTML) and Standard Generalized Markup Language (SGML). Such systems however, often do a poor job of preserving in the translated version of the text, the original intent, meaning, and look of the annotations in the original document. In one such system, HTML and SGML markup is placed in a translated version of the text adjacent to the translated word that corresponds to the word in the original text to which it was adjacent. This manner of insertion often results in inaccuracies in the translated version of the text due to markup that does not properly apply to words in the translated text to which it is adjacent, or due to markup that should not have been carried through to the translated version of the text.

It is therefore an object of the present invention to provide a system and method for translating a source document in a first language to a target document in a second language while preserving the annotations that exist in the source document, and inserting the annotations in appropriate locations in the target document.

SUMMARY OF THE INVENTION

The automated natural language translation system according to the invention has many advantages over known machine-based translators. After the system of the invention automatically selects the best possible translation of the input textual information and provides the user with an output (preferably a Japanese language or Spanish language translation of English-language input text), the user can then interface with the system to edit the displayed translation or to obtain alternative translations in an automated fashion. An operator of the automated natural language translation system of the invention can be more productive because the system allows the operator to retain just the portion of the translation that he or she deems acceptable while causing the remaining portion to be retranslated automatically. Since this selective retranslation operation is precisely directed at portions that require retranslation, operators are saved the time and tedium of considering potentially large numbers of incorrect, but highly ranked translations. Furthermore, because the system allows for arbitrary granularity in translation adjustments, more of the final structure of the translation will usually have been generated by the system. The system thus reduces the potential for human (operator) error and saves time in edits that may involve structural, accord, and tense changes. The system efficiently gives operators the fill benefit of its extensive and reliable knowledge of grammar and spelling.

The automated natural language translations system's versatile handling of ambiguous sentence boundaries in the source language, and its powerful semantic propagation provide further accuracy and reduced operator editing of translations. Stored statistical information also improves the accuracy of translations by tailoring the preferred translation to the specific user site. The system's idiom handling method is advantageous in that it allows sentences that happen to include the sequence of words making up the idiom, without intending the meaning of the idiom, to be correctly translated. The system is efficient but still has versatile functions such as long distance feature matching. The system's structural balance expert and coordinate structure expert effectively distinguish between intended parses and unintended parses. A capitalization expert effectively obtains correct interpretations of capitalized words in sentences, and a capitalized sequence procedure effectively deals with multiple-word proper names, without completely ignoring common noun interpretations.

The present invention is directed to an improvement of the automated natural language translation system, wherein the improvement relates to translating input textual information having annotations and being in a source or first natural language, such as English, into output textual information with the annotations preserved and being in target or second natural language, such as Japanese or Spanish. The annotations in the source document can represent part-of-speech settings, Hypertext Markup Language ("HTML") markup, Standard Generalized Markup Language ("SGML") markup, Rich Text Format ("RTF") markup and Nontypesetting Runoff ("NROFF") markup. In the present invention, annotations can be removed prior to translation, stored in an annotations database and inserted by the system at appropriate locations in the translated version of the source text. The system of the present invention employs a novel process involving creating a token string which includes word tokens representing the text, annotation tokens representing the annotations and ending tokens representing sentence breaks and sentence endings in the source document. As the word tokens are transformed and the annotation tokens are processed or otherwise removed during translation, the ending tokens are the only tokens that remain intact in the token string as the token string passes through the translator. As such, the ending tokens are used by the system to provide information relating to the original word tokens and annotation tokens as they appeared in the source document in the first language. Annotation tokens are stored in a document state database and linked with all other tokens in the document such that the annotations for any word token in the document can be determined. In this manner, the annotations are inserted at appropriate locations in the translated target document.

In one aspect, the system receives a source document in a first language comprising a plurality of sentences having text and annotations, and creates a first token string comprising a plurality of first language tokens and a plurality of annotation tokens disposed in the order of appearance in the source document. Additionally inserted into the token string are a plurality of end-of-sentence tokens to represent sentence endings in the source document. In one aspect of the invention, prior to translation, the plurality of annotation tokens are removed from the token string, stored in the storage module and linked to the end-of-sentence tokens in the storage module. The first language tokens are translated and the second language tokens are created in the target natural language. The end-of-sentence tokens are then used to retrieve from memory the annotation tokens and the links between the first language tokens and the second language tokens to recreate the original source document and determine where the annotation tokens should be inserted therein. Upon determining the locations for inserting each of the plurality annotation tokens, the annotation tokens are inserted into the source document, which can subsequently be stored and used as a reference tool should further processing of the target document or the source document be desired. Additionally, during translation, undefined first language tokens can be stored in the storage module and linked to the end-of-sentence tokens, such that after translation, a list of the undefined first language tokens can be provided to a user of the system.

In another aspect of the invention, the system comprises a computer means having a receiving module for receiving input textual information in a first language transmitted to the computer means by a computer input device, a processing module, a translation engine, and a storage module. The receiving module receives a source document in a first language comprising text and annotation. The processing module creates a first token string using the source document, where the token string comprises a plurality of first language tokens, a plurality of annotation tokens, and a plurality of end-of-sentence tokens. Each of the end-of-sentence tokens are inserted into the first token string at a location corresponding to a discontinuity in the text. The translation engine removes the plurality of annotation tokens from the first token string, translates the plurality of first language tokens to a plurality of second language tokens in a second token string, and creates a target document. In this embodiment, the plurality of end-of-sentence tokens can then be used to insert the annotations into a recreated source document. In an alternative embodiment, the annotations are inserted into the target document. The storage module includes an annotation database for storing the annotation tokens, in which the annotation tokens are linked to the end-of-sentence tokens, a dictionary source database for storing the first language tokens and the second language tokens, in which the end-of-sentence tokens provide links between the first language tokens and the second language tokens in the database, and an undefined tokens database for storing undefined first language tokens, in which the end-of-sentence tokens provide links to the undefined first language tokens in the undefined tokens database.

In another aspect of the present invention, the system preserves annotations such as HTML markup, SGML markup, RTF markup and NROFF markup in the source text. In one aspect of the invention, the processing module creates HTML tokens representing HTML markup in the source document. The storage module further includes a markup database for linking HTML markup with each first language token in the first token string to which the HTML markup applies. The translation engine can further access the markup database and compare the second token string with the HTML markup linked to the first language tokens to determine locations in the second token string where the HTML markup should be inserted.

In still another aspect of the invention, a method for translating an annotated source document in a first language to a target document in a second language having corresponding annotations comprises, receiving a source document in a first language, comprising a plurality of sentences having text and annotations, creating a first token string using the source document, the first token string comprising a plurality of first language tokens and a plurality of annotation tokens that apply to the first language tokens, removing the annotation tokens from the first token string, creating a plurality of annotation records for the first language tokens, each annotation record linking one of the first language tokens to each of the annotation tokens that apply to the first language token, storing the annotation records in a document state database, translating the plurality of first language tokens and creating a second token string comprising a plurality of second language tokens, determining at which locations in the second token string the annotation tokens should be inserted using the annotation records, and producing a target document in the second language using the second token string.

In yet another aspect of the invention, the method of preserving annotations, particularly HTML markup annotations during translation, comprises determining whether any of the annotation tokens comprise HTML characters, determining whether the HTML characters comprise characters entity references, substituting characters for the character entity references, determining whether any of the annotation tokens comprising HTML characters should not be preserved in the second token string, deleting the annotations tokens that should not be preserved, determining whether any of the tokens in the first token string should not be translated, removing the tokens that should not be translated from the first token string, storing the removed tokens, and inserting marker tokens into the first token string in the locations where the tokens were removed. In still another aspect of the invention, the method of preserving annotations during translation comprises determining whether the annotation tokens represent a discontinuity such as a section break or a sentence ending in the source text, inserting ending tokens representing the discontinuity, into the first token string and storing the tokens in the first token string up to the discontinuity in a database indexed by the ending token.

In still another aspect of the invention, the system for preserving annotations includes a means for receiving a user input such as an edit to a source document, an alternate text producer for producing alternate word tokens, and an alternate translator for processing an input from a user and providing translation options to the user.

These and other features of the invention will be more fully appreciated by reference to the following detailed description which is to be read in conjunction with the attached drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
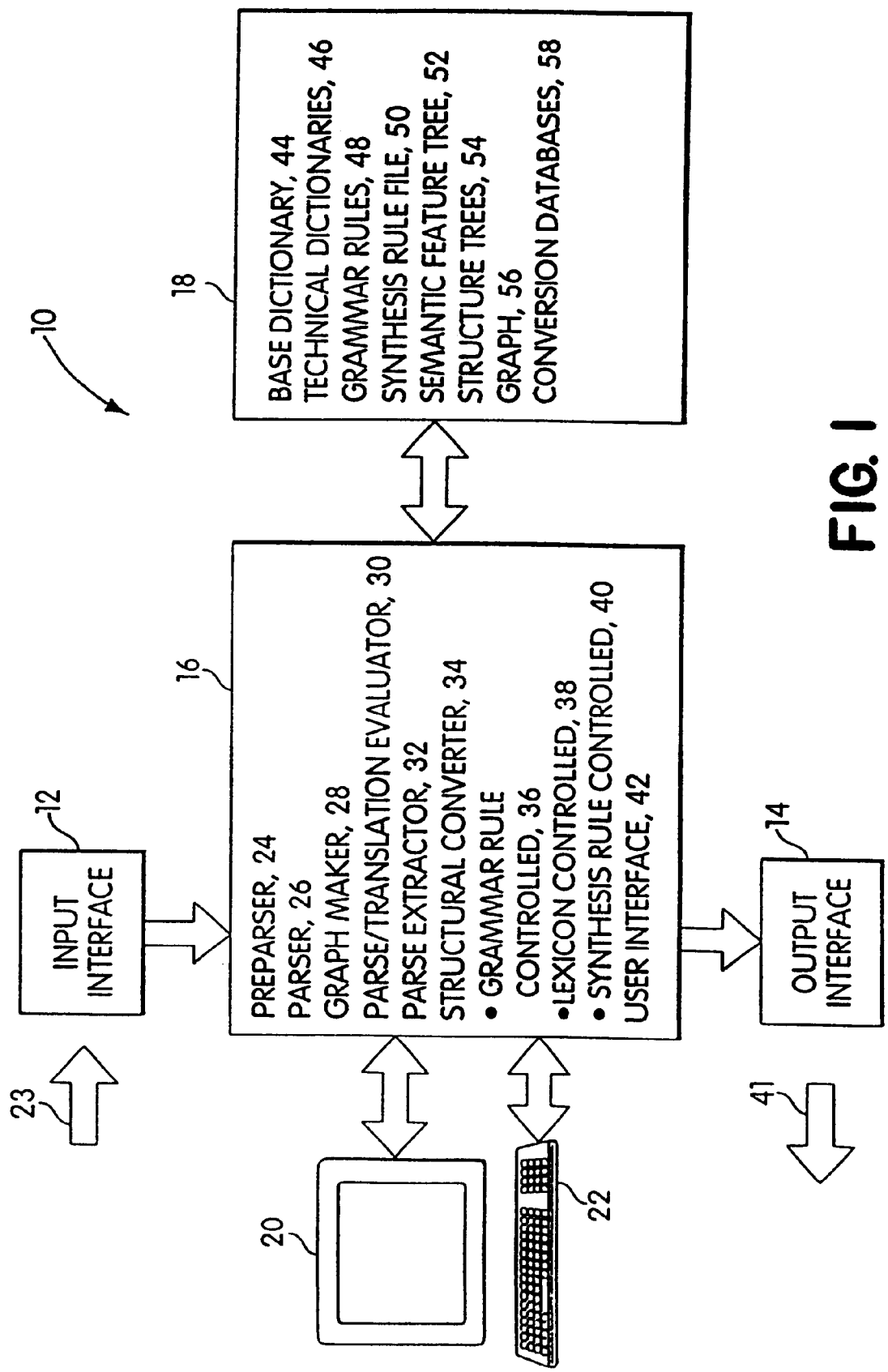
FIG. 1 is a block diagram illustrating a system for performing automated translation of natural language.

A general description of an automated natural language translations system according to the invention is first provided below without reference to any of the drawings. After the general description of the system, reference will be made to the various drawings.

An automated natural language translation system can translate from a source natural language to a target natural language. In one embodiment, the system translates from English to Japanese. In another embodiment, the system translates from Japanese to English. The system comprises means for receiving and storing the source natural language, a translation engine for creating a translation into the target natural language, means for displaying the translation to a user, and means for obtaining for a user and displaying to a user alternative translations. In one embodiment of the system, the translation engine includes a preparser, a parser, a graph maker, an evaluator, a graph scorer, a parse extractor, and a structural converter. The preparser examines the input text and resolves any ambiguities in input sentence boundaries. The preparser then creates and displays the input text in a parse chart seeded with dictionary entries. The parser parses the chart to obtain possible syntactic categories for the input text. The graph maker produces a graph of the possible syntactic interpretations of the input text based on the parse chart. The graph includes nodes and subnodes which are associated with possible interpretations of the input text The evaluator, which comprises a series of experts, evaluates the graph of the possible interpretations and adds expert weights to the nodes and subnodes of the graph. The graph scorer uses the expert weights to score the subnodes, and the graph scorer then associates the N best scores with each node. The parse extractor assigns a parse tree structure to the preferred interpretation as determined by the graph scorer. The structural converter performs a structural conversion operation on the parse tree structure to obtain a translation in the target language.

In the following three paragraphs, a description is provided of how: (a) the graph scorer combines the expert weights to compute a final weighted score for each subnode; (b) the graph scorer combines the subnode scores to arrive at a final node score; and (c) linguistic information is propagated through the tree of nodes and subnodes.

To compute the final weighted score for each subnode, the graph scorer associates a constant value with each subnode. An analysis of the linguistic information associated with each subnode determines the subnode score. See, for example, FIG. 8 where a series of expert evaluators examine the linguistic information stored at each node and subnode. The graph scorer adds together the individual weighted scores for each expert to obtain a final weighted average for a particular node or subnode. The combination of a plurality of weighted scores into a single weighted average score is a standard problem in computer science. One method that can be used is to multiply each expert result by a constant number (weight) assigned to that expert. The weight assigned to each expert is a matter of design choice. The designer can choose the priority (weight) to assign each expert. The weighted average is the summation of a series of numbers wherein each number is multiplied by a constant. For example, $$\text{weighted average} = (w_1)(x_1) + (w_2)(x_2) + \ldots + (w_n)(x_n)$$

where the weights, $w_1, w_2, \ldots w_n$, are all nonnegative and add up to 1. See, for example, Spiegel, *Theory and Problems of Probability and Statistics* 76 (McGraw-Hill, Inc. 1975) which discusses the use of weighted averages in the context of statistical expectations.

To combine subnode scores to obtain a final node score, the graph scorer can propagate the subnode scores from the bottom of the graph up to the top of the graph. Given the graph, wherein each node has a set of N scores, it is possible to determine one or more propagation methods. One technique which can be used to propagate the subnode scores is memoization which is a type of dynamic-programming used to solve optimization problems. The solution to optimization problems can involve many possible values (outcomes). The task is to find the optimal value. The algorithm used in optimization solves every subsubproblem just once and saves the outcome, thus avoiding the need to recompute the answer every time the subsubproblem is encountered. For a more detailed explanation of memoization as applied to optimization problems, see, for example, Cormen et al., *Introduction to Algorithms* 301–314 (McGraw-Hill Book Co. 1990). The method described at pages 301, 302, and 312 of *Introduction to Algorithms* is one method that can be used for propagating subnode score information through the graph.

In propagating linguistic information through the tree, the semantic propagation part of the system operates to propagate semantic information from smaller constituents to the larger constituents that they comprise. Semantic propagation applies to the four classes of syntactic categories (SEMNP, SEMVP, SEMADJ, and VERB) used in the parsing operation. Before semantic propagation can occur, the linguistic information stored at the nodes must be analyzed. The analysis of the semantic information stored at the nodes is guided by a set of rules that tell from examining the noun-like and verb-like constituents in a grammar rule which selectional restriction slots of the verb-like constituents apply to which noun-like objects. Gerald Gazdar discusses in his text *Natural Language Processing In Prolog* (Addison-Wesley Publishing Co., 1989) a set of rules which can be used to analyze the semantic information stored at the nodes in a directed acyclic graph similar to that disclosed in the specification. Gazdar discusses the use of feature matching to match information on adjacent nodes. Gazdar states that feature matching involves equations that say that certain features appearing on one node must be identical to the features appearing on another. Most current work assumes a principle that is responsible for equating one class of feature specifications as they appear on the mother category and the daughter which manifests the morphology associated with those features. This daughter is known as the "head" of the phrase. Most phrases only have a single head. Thus, for example, a verb phrase inherits the tense of its verb since the latter is the head of the verb phrase. There is no straightforward way of specifying this principle on a grammar-wide basis with the notational resources that we have used so far, but we can stipulate the effects of the principle on a rule-by-rule basis quite simply if we assume that the relevant features are all to be found on a single branch of the DAG. Let us call the label on this branch head. Then we can write a typical VP rule as follows:

VP---->V NP PP

<V head>=<VP head>

This requires that the value of the head feature on the V and that on the mother VP be identical.

The rules discussed in Gazdar can be easily adapted for each of the syntactic categories discussed herein. The linguistic information assigned to each node using Gazdar's rules can be propagated through the tree using memoization techniques.

Thus, summarizing the previous three paragraphs, the weighted average is one method of determining the subnode score, each subnode score can be propagated through the graph using known memoization techniques as applied to optimization problems, and the strategy discussed in Gazdar's text can be used to analyze the linguistic information stored at each node and this linguistic information can be propagated through the parse tree chart using memoization techniques.

The automated natural language translation system can perform automated re-translation functions after the initial automatic translation. That is, after the system automatically selects the best possible translation of the input textual information and provides the user with an output (preferably a Japanese language translation of the input English text, or a Japanese-to-English translation), the user can then interface with the system to edit the displayed translation or to obtain alternative translations in an automated fashion.

The automated natural language translation system uses a linguistic model which breaks a sentence into substrings. A substring is one or more words which occur in the order specified as part of the sentence. For instance, substrings of "The man is happy" include "The," "The man," "man is happy," "is," and "The man is happy" itself, but not "is man," "man man," and "The is."

Different linguistic models classify substrings in various ways and in different levels of detail. For instance, in "They would like an arrow," "an arrow" is typically classified as a noun phrase (NP). Some models would also classify "an arrow" with syntactic features (for instance, it is a singular noun phrase), and semantic features (it refers to a weapon).

If the phrase is ambiguous, there may be two or more ways of classifying it. For instance, "an arrow" can also refer to a symbol with an arrow-like shape. When linguistic models provide a method for resolving ambiguity, they usually do so by combining smaller units into larger units. When evaluating a larger unit, these models consider only a portion of the information contained in the larger unit.

In an exemplary embodiment of the system, the semantic property of "an arrow" (symbol vs. weapon) is used in evaluating the verb phrase "like an arrow" in the sentence "They would like an arrow." In contrast, if the syntax of the phrase "an arrow" were changed as in "He shot it with an arrow," the semantic property of "an arrow" is not used in evaluating the verb phrase "shot it with an arrow."

For any substring of a sentence interpreted in a single way with regard to a specific linguistic model (an interpreted substring), exported properties exist. Exported properties are all properties used to evaluate the combination of an interpreted substring with other units to form larger substrings. An export is an interpreted substring interpreted together with its exported properties. Properties that are contained within the interpreted substring but not exported are called substructures.

The parser of the system includes a grammar database. The parser finds all possible interpretations of a sentence using grammatical rules. The grammar database consists of a series of context-free phrase structure rules of the form X=A1 A2 . . . An. X is composed of, or made from, A1 A2 . . . An, and is referred to as a higher node of lower nodes (subnodes) A1 through An.

The graph maker of the system graphically represents the many possible interpretations of a sentence. Each node of the graph corresponds to an export of some substring. In one embodiment of the system, a single export is represented by a single node. The graph contains arcs which emanate from the nodes associated with an export. The arcs represent the substructure of the export based on the application of grammar rules. The graph may depict at least two types of arcs: (1) a unary arc which points to a single different export of the same substring; (2) a binary arc which includes a pair of pointers which points to two exports, the substrings of which when concatenated form the substring of the original export. Note that the formulation described in (2) assumes a grammar in Chomsky normal form. Amended claim 35 applies to grammars not in Chomsky normal form by rephrasing type (2) to reflect an arc having an N-tuple of pointers, pointing to N exports.

The graph also includes a single starting export S from which all portions of the graph can be reached by following a series of arcs. The starting export corresponds to the entire sentence.

Multiple arcs emanate from a node if and only if the same export can be composed of one or more exports (the pair of pointers in a binary arc is not considered multiple arcs for this purpose). Multiple arcs point to a node if and only if that export is a component of multiple exports. A node with no arcs projecting from it corresponds to a dictionary entry assigned to the substring.

A plurality of linguistic experts assign a numerical score to a set of exports. The linguistic experts apply the score to each node of the graph. In one embodiment of the system, a scoring array (where each element of the array is a weight to multiply by a particular expert's score) is a fixed length "N" of floating point numbers for any given sentence.

The score is evaluated by a scoring module which may be integrated with the graph-making engine and/or the parser. Scores are computed for all exports that make up a higher export. The score for the higher export is computed as the sum of the exports that make up the higher level export and the scores of any experts that apply to the combination such as a score assigned by the structural balance expert.

The order in which nodes are visited and scored is a standard depth-first graph-walking algorithm. In this algorithm, nodes that have been scored are marked and are not scored again. During the scoring process, the scoring module evaluates dictionary entry nodes before evaluating any of the higher unit nodes. Each dictionary entry gives rise to a single score.

Multiple scores result where there are multiple ways of making an export, i.e., k ways of making the export result in k possible scores. Multiple scores are handled as follows:

(1) For a unary rule, each of the k scores of the lower export is added to the expert values that apply to the unary rule, and the resulting vector of k scores is associated with the parent export.

(2) For a binary rule, assume that the left child has g scores and the right child has h scores. Then a total of g times h scores are computed by adding each of the left child's scores to each of the right child's scores, and in addition, adding the expert values that apply to the binary rule. When g times h exceeds N, only the N best scores are kept with the parent node.

(3) When a node's export can be created in multiple ways, at most N scores are added to that node's score list, the best scores being kept.

When scoring is complete, the above methods assure that each export has associated with its node a set of g scores (g ranging from 1 to N) which represent the g most likely ways (relative to the linguistic model) of making the export, including all substructure properties which are not represented in the export. In the special case of the root node S, the scoring method gives rise to the g most likely ways of making the sentence.

Each score in each score list described above has an associated pointer. The pointer provides information to indicate which score(s) of the score list of lower export(s) were combined to produce the higher level score. By following the respective pointers, the g most likely interpretations of the sentence can be extracted as unambiguous parse trees.

Further details of the automated natural language translation system will now be disclosed with reference to FIGS. 1–9. Various improvements according to the invention are described thereafter with reference to FIGS. 10, 11, and 12.

Figure 2:
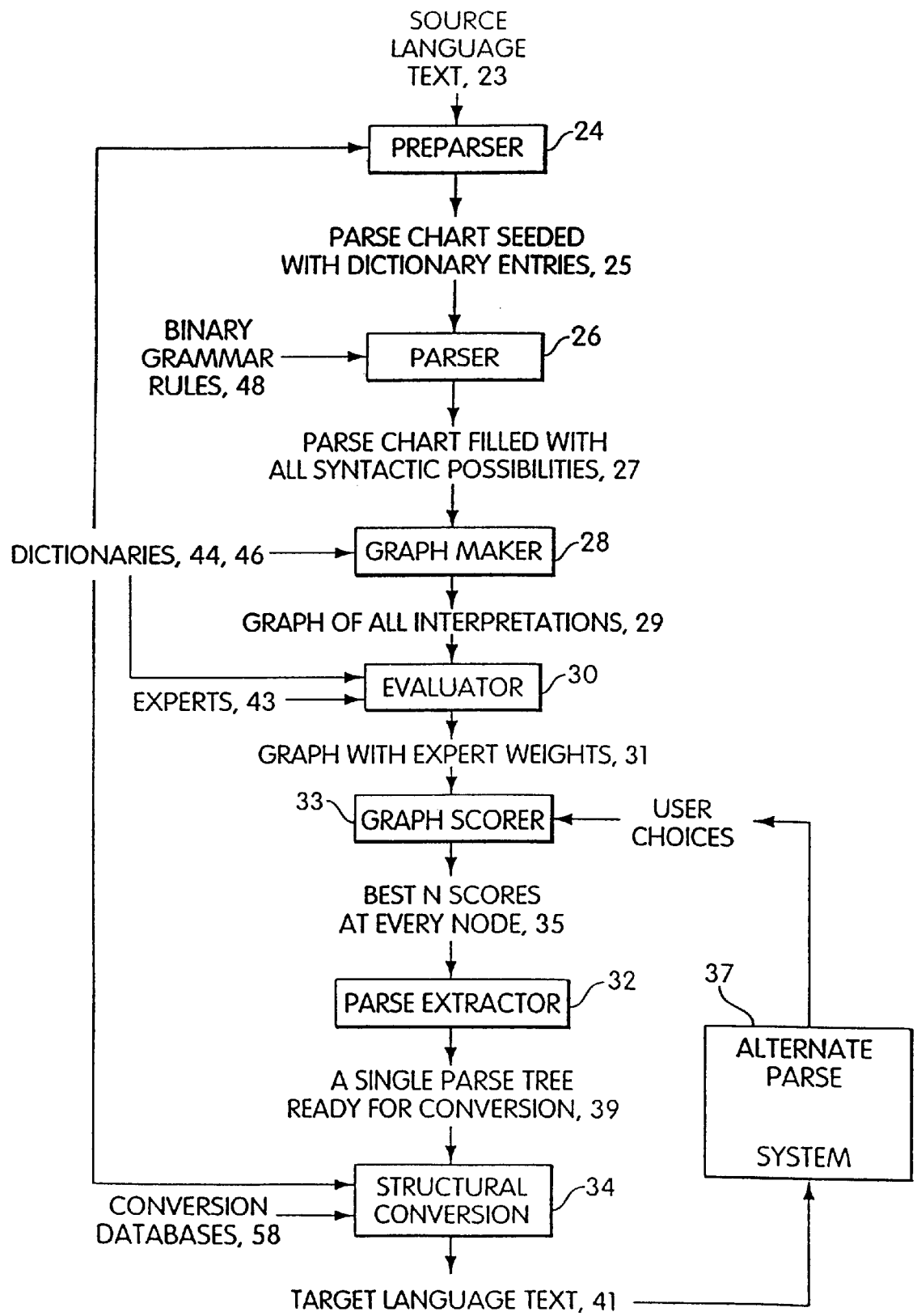
FIG. 2 is a data flow diagram illustrating overall functioning of the system of FIG. 1.

Referring to FIGS. 1 and 2, an automated natural language translation system 10 according to the invention includes an input interface 12, a translation engine 16, storage 18, a user input device 22, a display 20, and an output interface 14. The input interface is constructed to receive a sequence of text in a source language, such as English or Japanese. The input interface may comprise a keyboard, a voice interface, or a digital electronic interface, such as a modem or a serial input. The translation engine performs translation operations on the source text, in conjunction with data in storage. The translation engine may be comprised entirely of hardwired logic circuitry, or it may contain one or more processing units and associated stored instructions. The engine may include the following elements, or parts of them: A preparser 24, a parser 26, a graph maker 28, a parse/translation evaluator 30, a parse extractor 32, a structural converter 34, and a user interface 42, which includes an alternate parse system 37. The structural converter may comprise a grammar rule controlled structural converter 36, a lexicon controlled structural converter 38, and a synthesis rule controlled structural converter 40. The storage 18 may include one or more areas of disk (e.g., hard, floppy, and/or optical) and/or memory (e.g., RAM) storage, or the like. It may store the following elements, in whole or in part: a base dictionary 44, technical dictionaries 46, user-created dictionaries, grammar rules 48, synthesis rules 50, a semantic feature tree 52, structure trees 54, and a graph 56. The storage 18 also is used to store input textual information in a source natural language, output textual information in a target natural language, and all sorts of information used or useful in performing the translation including one or more dictionaries, domain keywords, grammar rules, and other databases. The user input interface 22 may comprise a keyboard, a mouse, touchscreen, light pen, or other user input device, and is to be used by the operator of the system. The display may be a computer display, printer or other type of display, or it may include other means of communicating information to the operator. The output interface 14 communicates a final translation of the source text in the target language, such as Japanese. The interface may comprise a printer, a display, a voice interface, an electronic interface, such as a modem or serial line, or it may include other means for communicating that text to the end user.

Figure 3:
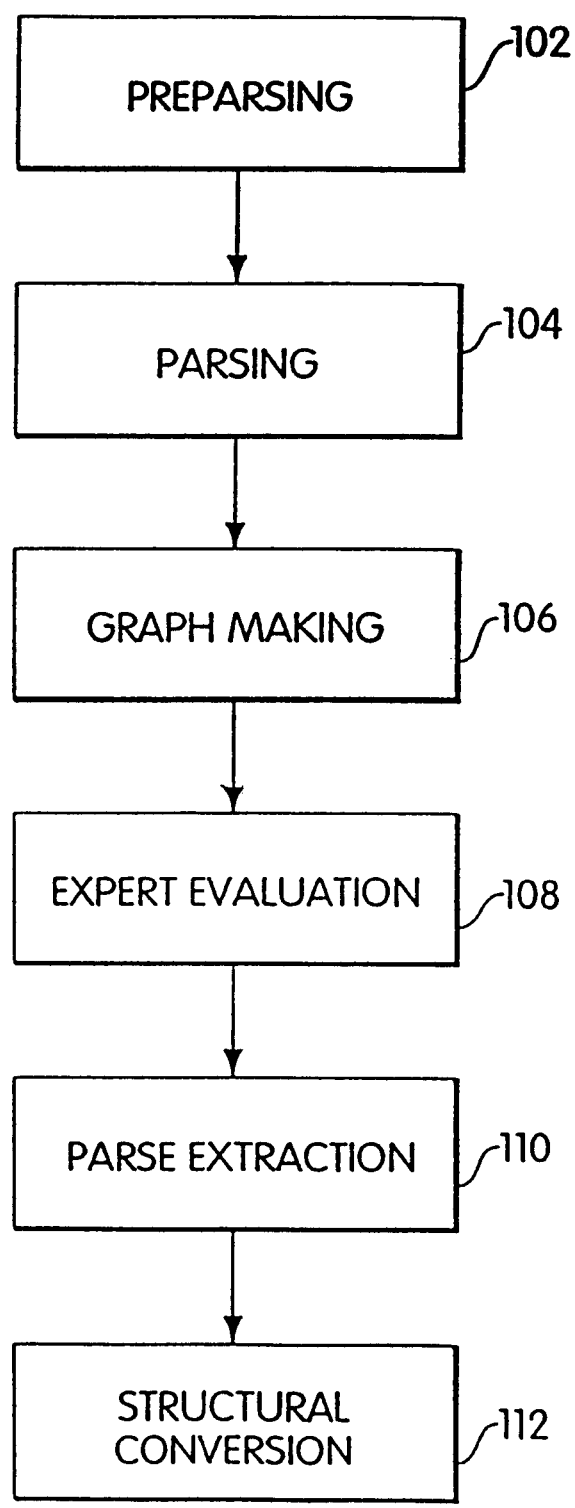
FIG. 3 is a flow diagram illustrating the operation of the system of FIG. 1.

In operation of one embodiment of the translation system of the invention, referring to FIGS. 1, 2 and 3, the preparser 24 first performs a preparsing operation (step 102) on the source text 23. This operation includes the resolution of ambiguities in sentence boundaries in the source text, and results in a parse chart seeded with dictionary entries 25. The parser 26 then parses the chart produced by the preparser (step 104), to obtain a parse chart filled with syntactic possibilities 27. The graph maker 28 produces a graph of possible interpretations 29 (step 106), based on the parse chart resulting from the parsing step. The evaluator 30, which accesses a series of experts 43, evaluates the graph of stored interpretations (step 108), and adds expert weights to the graph 31. The graph scorer 33 scores nodes and associates the N (e.g., 20) best scores with each of them 35. The parse extracter 32 assigns a parse tree structure 39 to this preferred interpretation (step 110). The structural converter 34, which accesses the conversion tables 58, then performs a structural conversion operation (step 112) on the tree to obtain a translation 41 in the target language. The user may interact with the alternate parse system 37 to obtain alternative translations.

Figure 4:
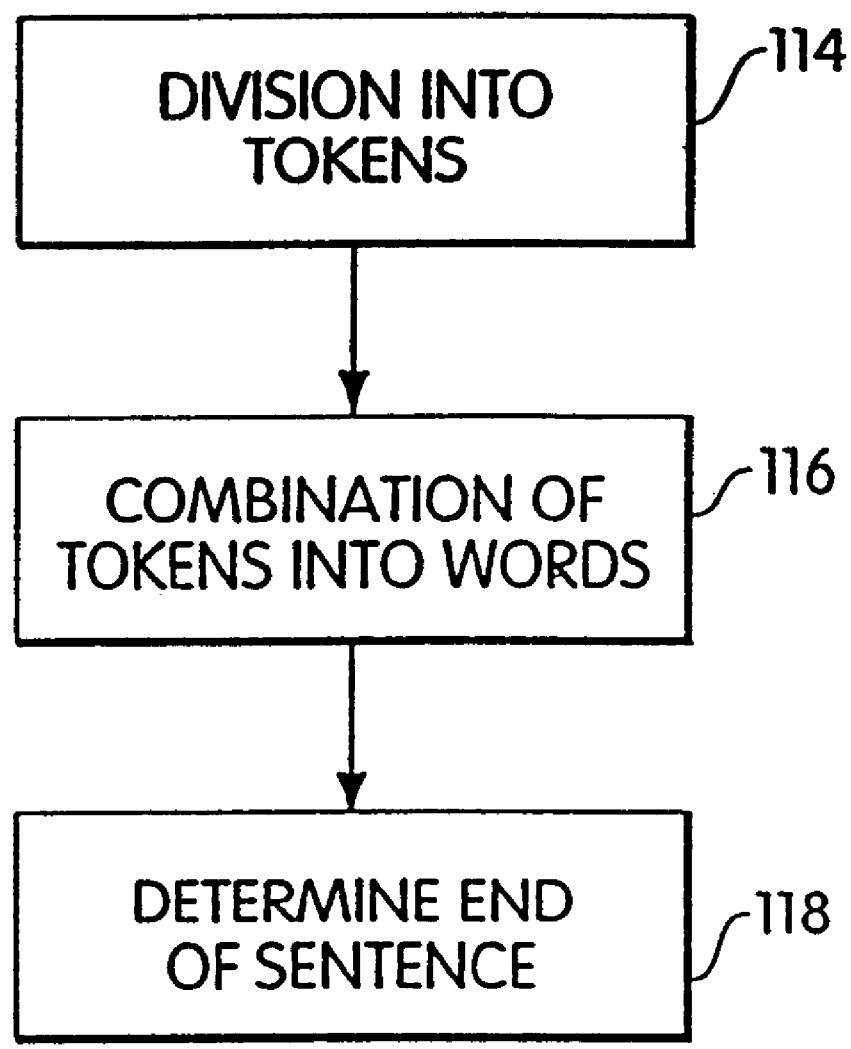
FIG. 4 is a flow diagram illustrating the operation of the end-of-sentence function of the preparser of the system of FIG. 1.

Referring to FIG. 4, the system begins the preparsing operation by dividing the input stream into tokens (step 114), which include individual punctuation marks, groups of letters that form words, and groups of letters, characters or symbols that form annotations. The occurrence of whitespace affects the interpretation of characters at this level. For instance, in "x - y" the "-" is a dash, but in "x-y" it is a hyphen.

The preparser then combines the tokens into words (step 116). At this level, it recognizes special constructions (e.g., internet addresses, telephone numbers, and social security numbers) as single units. The preparser also uses dictionary lookup to find groupings. For example, if "re-enact" is in the dictionary as "reenact" it will become one word in the sentence, but if it is not, then it will remain as three separate "words".

The next preparsing phase involves determining where the sentence ends (step 118). During this operation, the preparser accesses the base dictionary and the technical dictionaries, and any user-created dictionaries, as it follows a sequence of steps for each possible sentence ending point (i.e., after each word of the source text). The preparser need-not perform these steps in the particular order presented, and these may be implemented as a series of ordered rules or they may be hard-coded.

Figure 5:
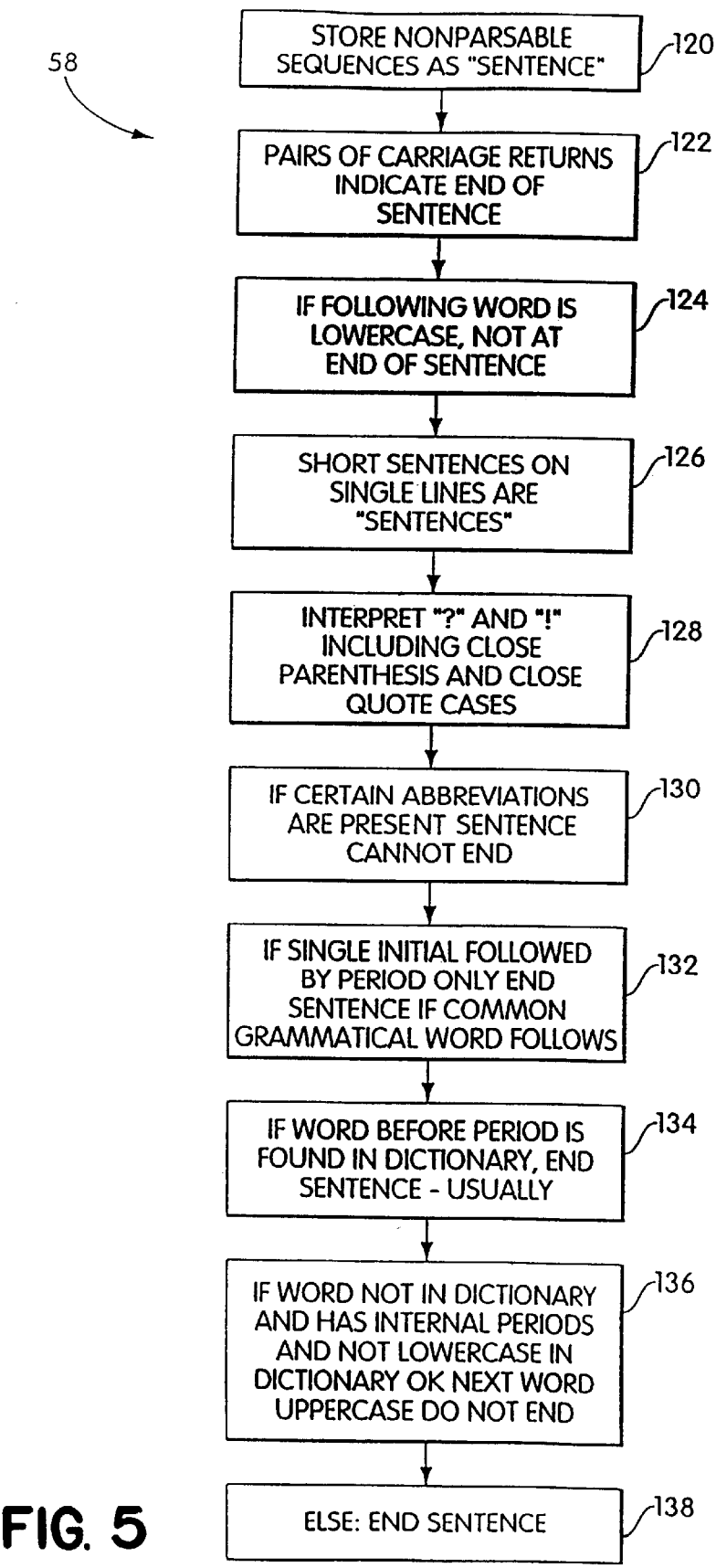
FIG. 5 is a flow diagram illustrating the operation of the parser of the system of FIG. 1.

Referring to FIG. 5, the preparser interprets and records any nonparsable sequence of characters, such as a series of dashes: "------", as a "sentence" by itself, although not one which will be tanslated (step 120). The preparser also requires any sequence of two carriage returns in a row to be the end of a sentence (step 122). If the first letter of the next word is a lower case letter, the preparser will not indicate the end of a sentence (step 124). If a sentence started on a new line and is short, the preparser considers it a "sentence" of its own (e.g., a title).

The preparser interprets a period, a question mark, or an exclamation mark as the end of a sentence, except in certain situations involving end parenthesis and end quotes (step 128). In the case of sentences that end with ." or ?" or the like, the preparser uses virtual punctuation marks after the quote in addition to the punctuation before the quote. Alternatives for the underlying punctuation required for ?" are illustrated in the following examples:

The question was "What do you want?".

Did he ask the question "What do you want?"?

Are you concerned about "the other people"?

In English, each of these is likely to end with ?" The virtual punctuation marks added by the preparser indicate that before the quote there is something which can be either a question mark or nothing at all. After the quote there is something that can be either a period or a question mark. The grammatical structure of the rest of the sentence allows later processing stages to select the best choice.

The preparser may also use several further approaches in preparsing a period (steps 130, 132, 134, 136, and 138). Some abbreviations in the dictionary are marked as never beginning sentences and others as never ending sentences (step 130). These rules are always respected. For example, "Ltd" never begins a sentence and "Mr" never ends one. The preparser also will not end a sentence with a single initial followed by a period unless the next word is a common grammatical word (step 132) such as "the", "in", etc. If the word before the period is found in any dictionary, the period will end the sentence (step 134). If the word before the period is not in this dictionary, and it has internal periods (e.g., I.B.M.) and the next word is not in the dictionary in a lowercase form, or the word after that is itself uppercase, then this is not an end of sentence (step 136). In remaining cases the period does mark the end of sentence (step 138).

Referring again to FIGS. 2 and 3, once the sentence boundaries have been defined by the preparser, the parser places the words of the sentence into syntactic categories, and applies grammar rules from the grammar database to them to compute possible syntactic interpretations 25 of the sentence (step 104). These grammar rules 48 can be implemented as a series of computer readable rules that express the grammatical constraints of the language. For the English language, there may be hundreds of such rules, which may apply to hundreds of syntactic categories. To reduce the computational overhead of this operation, the different possible meanings of a word are ignored.

In the next step (step 106), the graph maker employs the dictionary to expand the results of the parser to include the different meanings of words and creates a directed acyclic graph representing all semantic interpretations of the sentence. This graph is generated with the help of a series of semantic propagation procedures, which are described below. These procedures operate on a series of authored grammar rules and, in some cases, access a semantic feature tree for semantic information. The semantic feature tree is a tree structure that includes semantic categories. It is roughly organized from the abstract to the specific, and permits the procedures to determine how semantically related a pair of terms are, both in terms of their separation in the tree and their levels in the tree. For example, "cat" and "dog" are more related than "cat" and "pudding", and hence the former pair would be separated by a smaller distance within the tree. "Animal" and "cat" are examples of words that are stored at different levels in the tree, as "animal" is a more abstract term than "cat."

Figure 9:
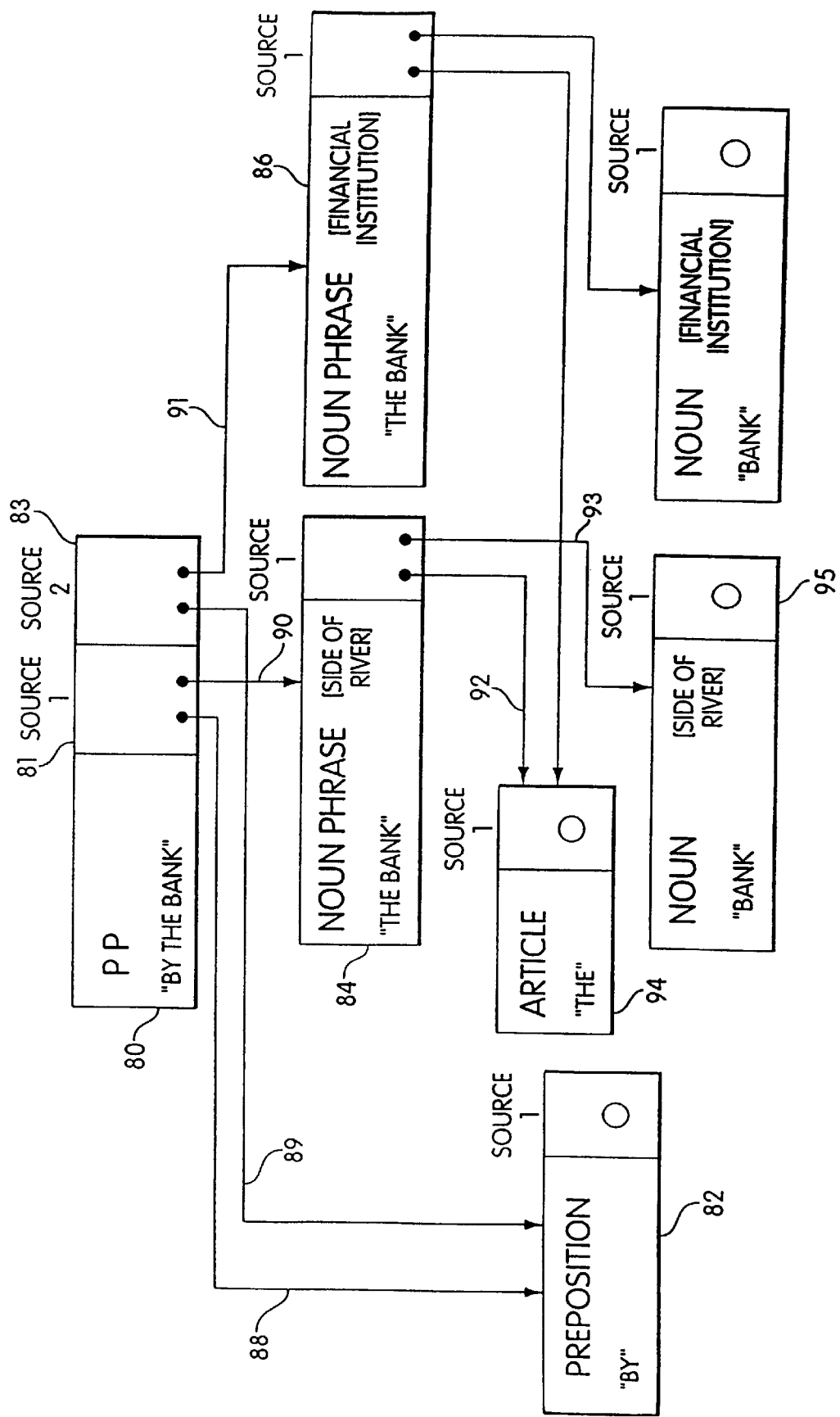
FIG. 9 is a diagram of a sample graph used by the system of FIG. 1 for the exemplary phrase "by the bank".

Referring to FIG. 9, the graph includes nodes 80 and their subnodes 82, 84, 86 linked by pointers 88, 89, 90, 91 in a manner that indicates various types of relationships. A first type of relationship in the graph is one where nodes representing phrases possess pointers to constituent word nodes or sub-phrase nodes. For example, a node 84 representing the phrase "the bank" will be linked by pointers 92, 93 to the constituent words "the" 94, and "bank" 95. A second type of relationship in the graph is where phrase interpretations possess pointers to alternate ways of making the same higher-level constituent from lower-level pieces. For example, a node 80 representing the phrase "by the bank" can have two source interpretation locations 81, 83, which each include pointers 88 & 89, 90 & 91 to their respective constituents. In this example, the different constituents would include different subnodes 84, 86 that each represent different meanings for the phrase "the bank". The structure of the graph is defined by the results of the parsing operation and is constrained by the syntax of the source sentence. The nodes of the graph are associated with storage locations for semantic information, which can be filled in during the process of semantic propagation.

The semantic propagation part of the system operates to propagate semantic information from smaller constituents to the larger constituents they comprise. It applies to four classes of the syntactic categories used in the earlier parsing operation: SEMNP (which includes noun-like objects and prepositional phrases), SEMVP (verb phrase like objects, which usually take subjects), SEMADJ (adjectives) and VERB (lexical verb-like verbs that often take objects). Other syntactic categories are ignored within a rule. The grammar rule author may also override the implicit behavior below by specific markings on rules. These specific instructions are followed first.

There are two aspects to the manner in which semantic features are propagated through the system. The first is a set of rules that tell from examining the noun-like and verb-like constituents in a grammar rule, which selectional restriction slots of the verb-like constituents apply to which noun-like objects. For instance, the rule for the verb phrase of the sentence: "I persuaded him to go" is roughly VP=VT11+ NP+VP (where VP is a verb phrase, VT11 is a type of transitive verb, and NP is a noun phrase). One exemplary default rule indicates that when a verb takes objects, selectional restrictions are to be applied to the first NP encountered to the right of the verb. Another rule says that VP restrictions on their subjects should be applied to the first NP found to the left of a VP. Together these rules make sure that "persuade him" and "him go" are both evaluated for their semantic plausibility. As mentioned before, these rules reflect the complex grammar of the English language and there may therefore be quite a few of them.

Figure 6:
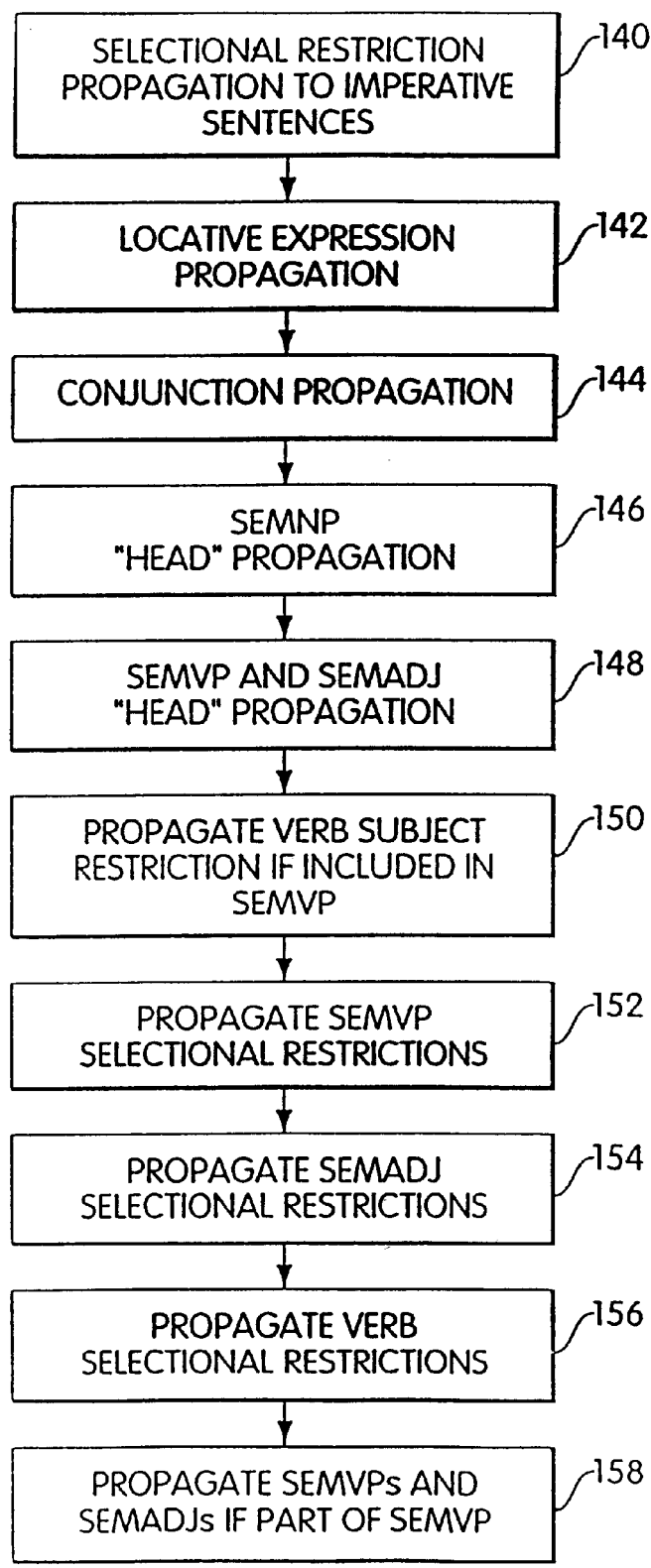
FIG. 6 is a flow diagram illustrating the semantic propagation operations of the system of FIG. 1.

Referring to FIG. 6, the semantic propagation operation includes copying of selectional restrictions from SEMVPs to imperative sentences (step 140). If a SEMNP is being used as a locative expression, its goodness is evaluated against semantic constants defining good locations (step 142). If a rule involves a conjunction of two SEMNPs (detected because of ANDing together of syntactic features), the graph maker ANDs together the semantic features and applies the semantic distance expert (step 144).

If, in the course of examining the rules specified for syntactic feature propagation, the graph maker locates a "head" SEMNP which gets propagated to a higher level (e.g., it becomes part of a SEMNP that includes more words), it propagates semantic features as well (step 146). However, if the "head" is a partitive word (e.g., "portion," "part"), it propagates from a SEMNP to the left or right instead. SEMVPs and SEMADJs are propagated in the same way, with the only exception being that SEMVPs and SEMADJs do not have any partitive situations (step 148). Adjectives are part of the SEMVP class for this purpose.

When a SEMVP is made from a rule including VERBs, the graph maker propagates upward the VERB's subject restriction unless the VP is a passive construction, in which case the VERB's first object restriction is propagated instead (step 150). In any rule containing SEMVPs, it attempts to apply the selectional restrictions of the SEMVPs to NPs encountered moving leftward from the SEMVP (step 152). In any rule containing SEMADJs, the graph maker attempts to apply the selectional restriction of the SEMADJ first to any SEMNPs encountered moving to the right from the SEMADJ, and if that fails, tries moving to the left (step 154).

For any remaining unused object selectional restrictions of a VERB (that have not been propagated upward because of passives), the graph maker applies them in turn to SEMNPs encountered in order to the right of the VERB (step 156). In all of these rules, a verb selectional restriction is used up as soon as it applies to something. In all rules up to this one, SEMNPs are not used up when something applies to them. Starting at this rule, the SEMNP does get "used up". Finally, if a rule makes a SEMVP, the graph maker determines if there are any SEMVPs or SEMADJs in it that have not yet been used, and if so, propagates them upward (step 158).

The system also performs feature matching of linguistic features. Linguistic features are properties of words and other constituents. Syntactic feature matching is used by the parser, and semantic feature matching is used by the graph maker. But the same techniques are used for both. For instance, "they" has the syntactic feature plural, while "he" has the feature of singular. Feature matching uses marking on grammar rules so that they only apply if the features of the words they are to apply to meet certain conditions. For example, one rule might be:

$$S=NP\{@\}+VP\{@\}$$

where the @ signs mean that the number features of the NP and VP must match. So while this rule will allow "they are" and "he is", it will not allow "they is" and "he are".

Feature match restrictions are broken into "local" and "long distance". The long distance actions may be computed when the grammar is compiled, rather than when actually processing a sentence. The sequence of long distance operations that must be performed is then encoded in a series of instruction bytes.

The computation of long distance feature operations must start with an n-ary rule (i.e., one that may have more than two inputs on its right). The system then distributes codes to various binary rules so that feature sets end up being propagated between rules in the correct fashion. By breaking the n-ary rules into binary rules, the parsing operations are greatly simplified, but because the system keeps track of feature sets across binary rules, it retains the power of the long distance operations.

The system of the invention also allows multiword "idioms" as part of the dictionary, while retaining representations of the individual words of which they are composed. These two forms may ultimately compete against each other to be the best representation. For instance "black sheep" is found in the dictionary with the meaning of a disfavored person. But in some cases the words "black sheep" may refer to a sheep which is black. Because both of the forms are retained, this non-idiomatic usage may still be chosen as the correct translation.

The idioms may belong to further categorizations. For example, the system may use the following three types:

Almighty: United States of America
Preferential: long ago
Normal: black sheep

Almighty idioms suppress any other possible interpretation of any of the words that make up the sequence. Preferential idioms suppress other constituents of the same general type and that use the very same words. Normal idioms compete on an even footing with other entries.

The resulting graph is to be evaluated by experts (step 108, FIG. 3), which provide scores that express the likelihood of correctness of interpretations in the graph. The system of the invention includes a scoring method that applies to all partial sentences of any length, not just fall sentences. An important element in the use of a graph is that a subtree is fully scored and analyzed only once, even though it may appear in a great many sentences. For example, in the phrase "Near the bank there is a bank.", the phrase "Near the bank" has at least two meanings, but the best interpretation of that phrase is determined only once. The phrase "there is a bank" similarly has two interpretations, but the best of those two is determined only once. There are therefore four sentence interpretations, but the subphrases are scored just once. Another feature of the graph is that each node is labeled with easily accessible information about the length of that piece of the sentence. This allows the best N interpretations of any substring of the English sentence to be found without reanalyzing the sentence.

Although, in one implementation, only the N overall best analyses of the sentence are available at any one time (N being a number on the order of 20), the use of a graph allows the system to integrate the result of a user choice about a smaller constituent and give a different N best analyses that respect the user's choice. Because all this is done without reparsing the sentence or rescoring any substrings, it may be done quickly.

Figure 8:
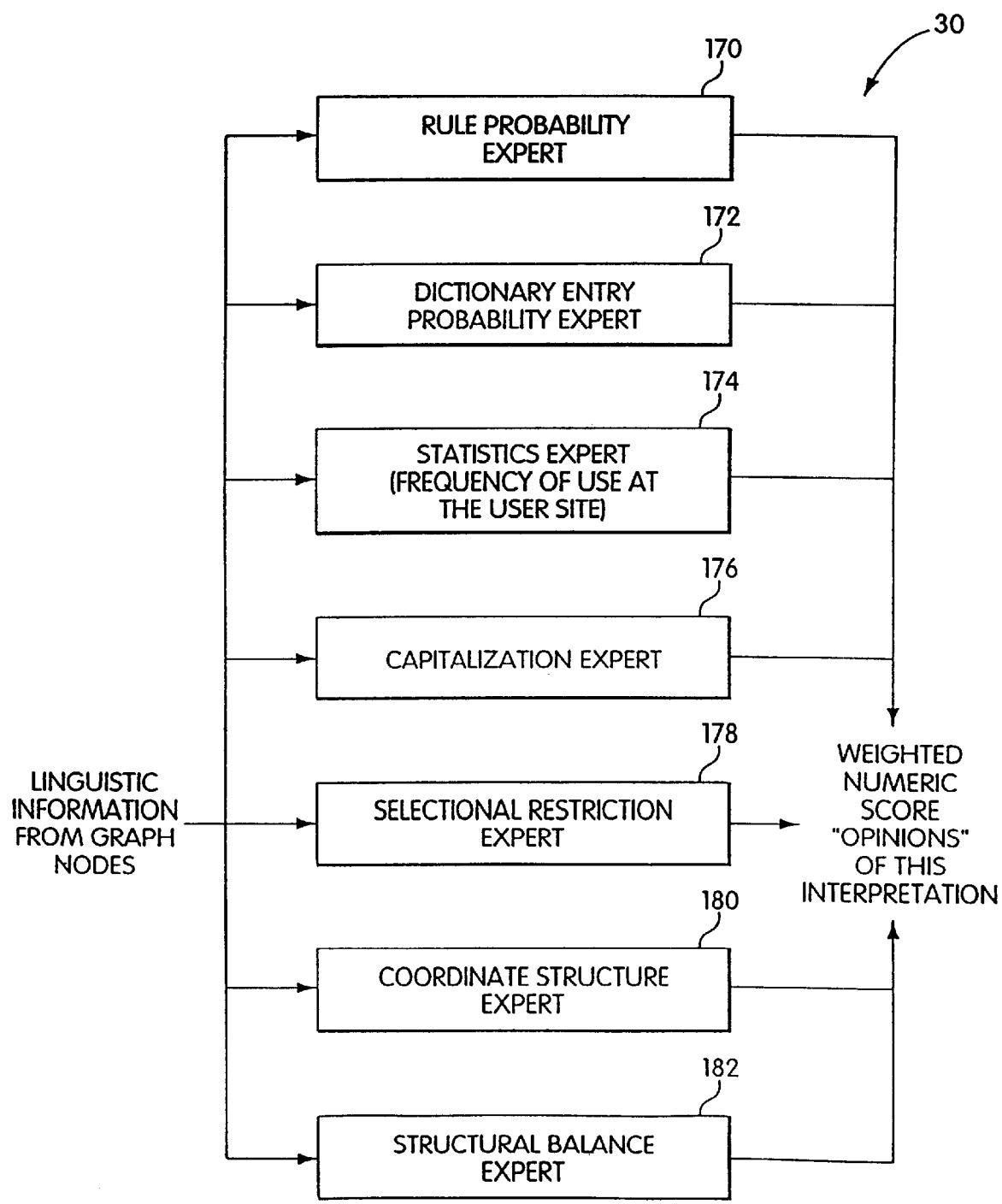
FIG. 8 is a flow diagram illustrating the expert evaluator of the system of FIG. 1.

Referring to FIG. 8, operation of the expert evaluator 30 is based on various factors that characterize each translation, which are handled by the various experts. The rule probability expert 170 evaluates the average relative frequency of grammalar rules used to obtain the initial source language parse tree. The selectional restriction expert 178 evaluates the degree of semantic accord of the given translation. The dictionary entry probability expert 172 evaluates the average relative frequency of particular "parts of speech" of the words in the sentence used to obtain the initial source language parse tree. The statistics expert evaluates the average relative frequency of particular paraphrases chosen for the given translation.

The system automatically determines the English "part-of-speech" (POS) for various individual English words, English phrases, and groups of English words. The system makes the automatic determination of the POS when translating sentences, and the system usually makes the correct choice. Occasionally, however, the sentence being translated is itself ambiguous. A word or phrase that can be interpreted as more than one POS leads to several distinct but "correct" meanings for the sentence in which the word or phrase appears. It is possible for an operator of the system to override the system's automatic POS determination and instead manually set the POS for any word, phrase, or group of words. For example, in the source English sentence "John saw a boy with a telescope", an operator of the system can set "a boy with a telescope" as a Noun Phrase to force the system to interpret the sentence to mean that the boy was carrying a telescope and thus reject the interpretation that John used a telescope to see the boy. An operator can address the situation where overriding the system's POS rules yields worse, not better, translation results by applying a few manual POS settings as possible or by applying less restrictive manual POS settings. Noun Phrase is less restrictive than Noun, and Group is the least restrictive POS setting. The following is a list of the various possible POS settings.

Part-of-Speech (POS)

Noun
Noun Phrase
Verb (transitive or intransitive)
Verb Phrase
Adjective
Adjectival Phrase
Adverb
Adverbial Phrase
Preposition
Prepositional Phrase
Conjunction
Group
English The parts of speech "Adjectival Phrase" and "Adverbial Phrase" are useful in the situation where an English sentence may have a different meaning depending on how a particular prepositional phrase is interpreted by the system. For example, the sentence "We need a book on the fourth of July" means "We need a book about the American fourth of July holiday" if "on the fourth of July" has an adjectival interpretation, but the sentence means "On the fourth day of July, we need a book" if the phrase "on the fourth of July" has an adverbial interpretation. If the operator believes the system has automatically assigned the incorrect POS to "on the fourth of July", the operator can manually set a different POS to "on the fourth of July" in the sentence "We need a book on the fourth of July". If an operator does not want the system to translate a particular word, phrase, or group of words from English to Japanese, the operator can assign the POS "English" to the desired word(s), phrase(s), and/or group(s) of words. It also is possible for an operator to remove one or more POS settings, regardless whether the settings were assigned automatically by the system or manually by an operator.

The system keeps track of statistical information from translation usage at each customer site at more than one level. For example, the system may maintain statistical counts at the surface form level (how often was "leaving" used as a transitive versus an intransitive verb), and also at the meaning level (did it mean "leave behind" or "depart" from), and this second type is summed over occurrences of "leave", "leaves", "left", and "leaving". The system may also keep statistical counts separately for uses that have occurred within the last several sentences, and uses that have occurred at any time at the customer site. Furthermore, the system may distinguish cases where the user intervened to indicate that a particular word sense should be used, from cases where the system used a particular word sense without any confirmation from the user.

The structural balance expert 182 is based on a characteristic of English and many other European languages pertaining to the lengths of constituents in a given sentence. In some (but not all) constructions, sentences which involve heavy (lengthy) elements to the left of light elements are disliked in these languages. For example:

Mary hit Bill with a broom.
   Light Heavy
   {acceptable}
Mary hit with a broom Bill.
   Heavy Light
   {unacceptable}
Mary hit with a broom a dog that tried to bite her.
   Heavy Heavier
   {acceptable}

Given two parses of a given sentence, if one contains a "Heavy-Light" sequence involving a construction that tends to avoid such a sequence, and if the other parse does not, then it can be assumed that the former does not represent the intended interpretation of the sentence. This expert is an effective way to distinguish between intended parses and unintended parses.

In coordinate structures of the pattern of "A of B and C" it can be difficult to determine whether the intended interpretation is "A of {B and C}" or "A {of B} and C". The coordinate structure expert 180 measures the semantic distance between B and C, and that between A and C to determine which mode of coordination combines two elements that are closer in meaning. This expert accesses the semantic feature tree during its operation. This expert is also an efficient way to distinguish between the intended parses and the unintended parses of a given sentence.

Many words in English include potential ambiguities between ordinary-noun and proper-name interpretations. The capitalization expert 176 uses the location of capitalization in a sentence to determine how likely it is that the capitalization is significant. For example, the following sentences:

Brown is my first choice.
My first choice is Brown.

are different in that while the former is genuinely ambiguous, it is far more likely in the latter that "Brown" is a person name than a color name. This expert takes into consideration factors such as whether a given capitalized word appears at sentence-initial or sentence-noninitial position (as shown above), whether the capitalized spelling is in the dictionary, and whether the lower-case-initial version is in the dictionary. This expert is an effective way to obtain the correct interpretations of capitalized words in sentences.

If a sentence contains a sequence of initial-uppercase words, it can be treated as a proper name or as a sequence of ordinary nouns. The system of the invention employs a capitalized sequence procedure, which favors the former interpretation. Also, if the sequence cannot itself be parsed by normal grammar rules, it can be treated as a single unanalyzed noun phrase to be passed through untranslated. This procedure has proven to be a very effective way of dealing with multiple-word proper names while not completely ignoring the lower-rated common noun interpretations.

Figure 7:
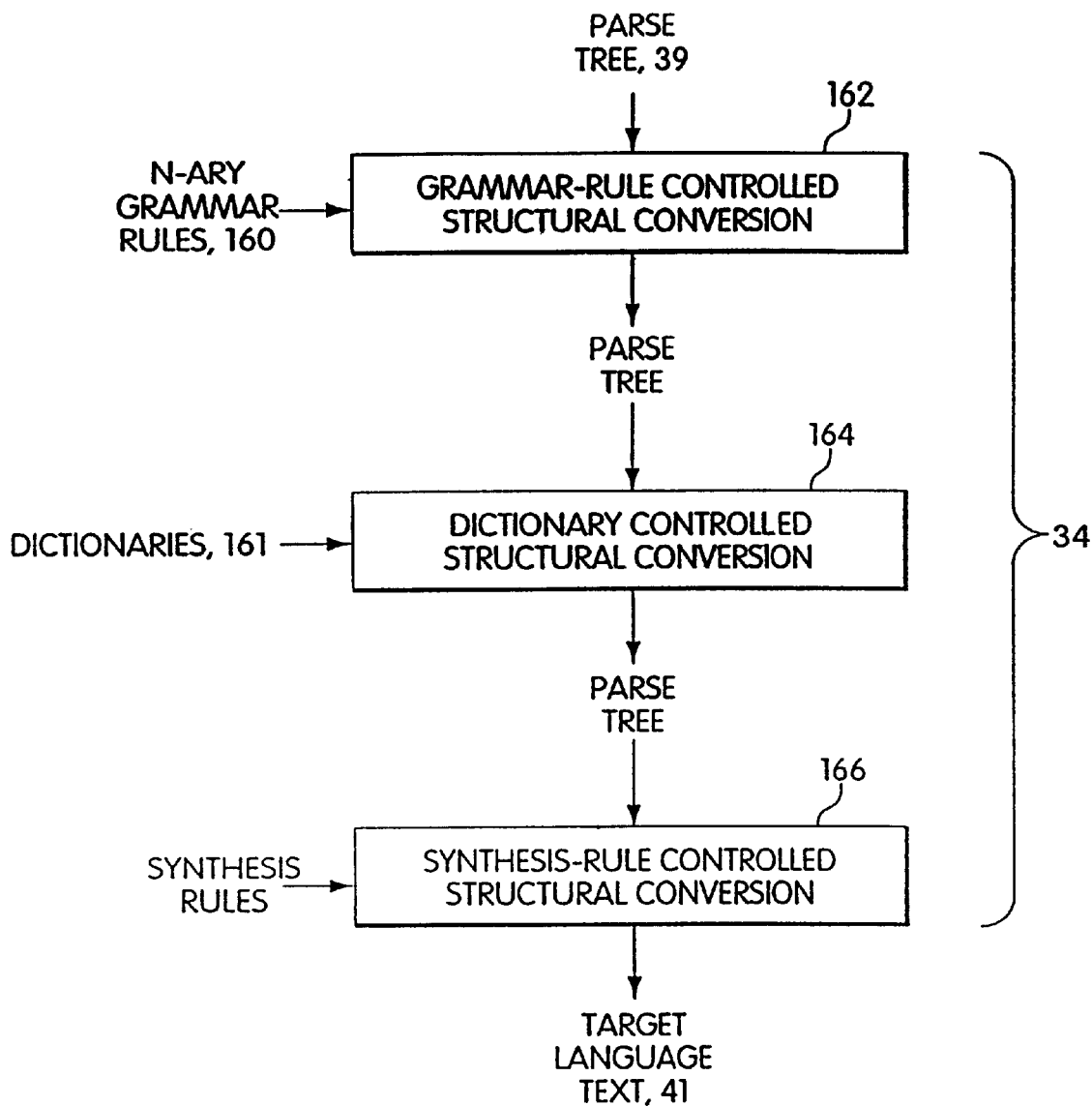
FIG. 7 is a flow diagram illustrating the structural conversion operations of the system of FIG. 1.

Referring to FIG. 7, the machine translation system of the invention uses a grammar-rule controlled structural conversion mechanism 162 that has the efficiency of a straightforward grammar-rule-based structural conversion method, but which comes close to the power of the template-to-template structural conversion method. This method relies on the use of grammar rules 160 which can specify non-flat complex substructure. While the following is a rule format used in other translation systems:

$$Y => X1 + X2 + \ldots Xn$$

Substructure Specified $$Y$$
$$X1 \quad X2 \ldots Xn$$

the system of the invention uses grammar rules of the following format:

$$Y => \#Z1(i)\#Z2(2)X1 + X2 \ldots + Xi + X(i+1) + \ldots X(n)$$

Substructure Specified

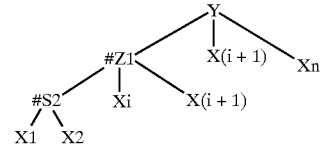

In this syntax, symbols prefixed with "#" are virtual symbols that are invisible for the purpose of sentence structure parsing, but which are used in building substructures once a given parse is obtained.

Given this type of grammar, it becomes possible to specify multiple structure conversion among any sequences of nodes that are siblings in the substructure. This transforms a grammar-rule-based structure conversion mechanism into one with some of the power of the template-to-template structure conversion mechanism. Although the system of the invention is based on the second type of grammar rules presented above, it automatically compiles the corresponding grammar rules of the first form. It can therefore use grammar rules of the first form to parse sentences, and use grammar rules of the second form to build parse structures.

The structural conversion also includes a dictionary controlled structural conversion operation 166, which accesses dictionaries 161 to operate on the parse tree after it has been operated upon by the grammar-rule controlled structural conversion operation. The synthesis-rule controlled structural conversion operation then applies synthesis rules to the resulting parse tree to provide the target language text 41.

Referring again to FIGS. 1 and 2, after the system has derived a best-ranked translation in the process described above, it is presented to the user via the display 20. The user then has the option of approving or editing the translation by interacting with the alternate parse system 37, via the user input device 22. In the editing operation, the user may constrain portions of the translated sentence that are correctly translated, while requesting retranslation of the remaining portions of the sentence. This operation may be performed rapidly, since the system retains the graph with expert weights 31.

Having described certain details of one embodiment of the automated natural language translation system with reference to FIGS. 1–9, improvements according to the present invention are now described with reference to FIGS. 10 through 18. These improvements provide enhanced translation of text having annotations such as part-of-speech settings, HTML markup, SGML markup, RTF markup and NROFF markup. For example, with these improvements, an HTML document representing a page in English on the World Wide Web portion of the Internet can be converted into an equivalent HTML document representing a page in Japanese or Spanish on the World Wide Web. It is to be appreciated that the terms "markup" and "tag" are used hereafter interchangeably to refer to the above annotations.

Figure 10:
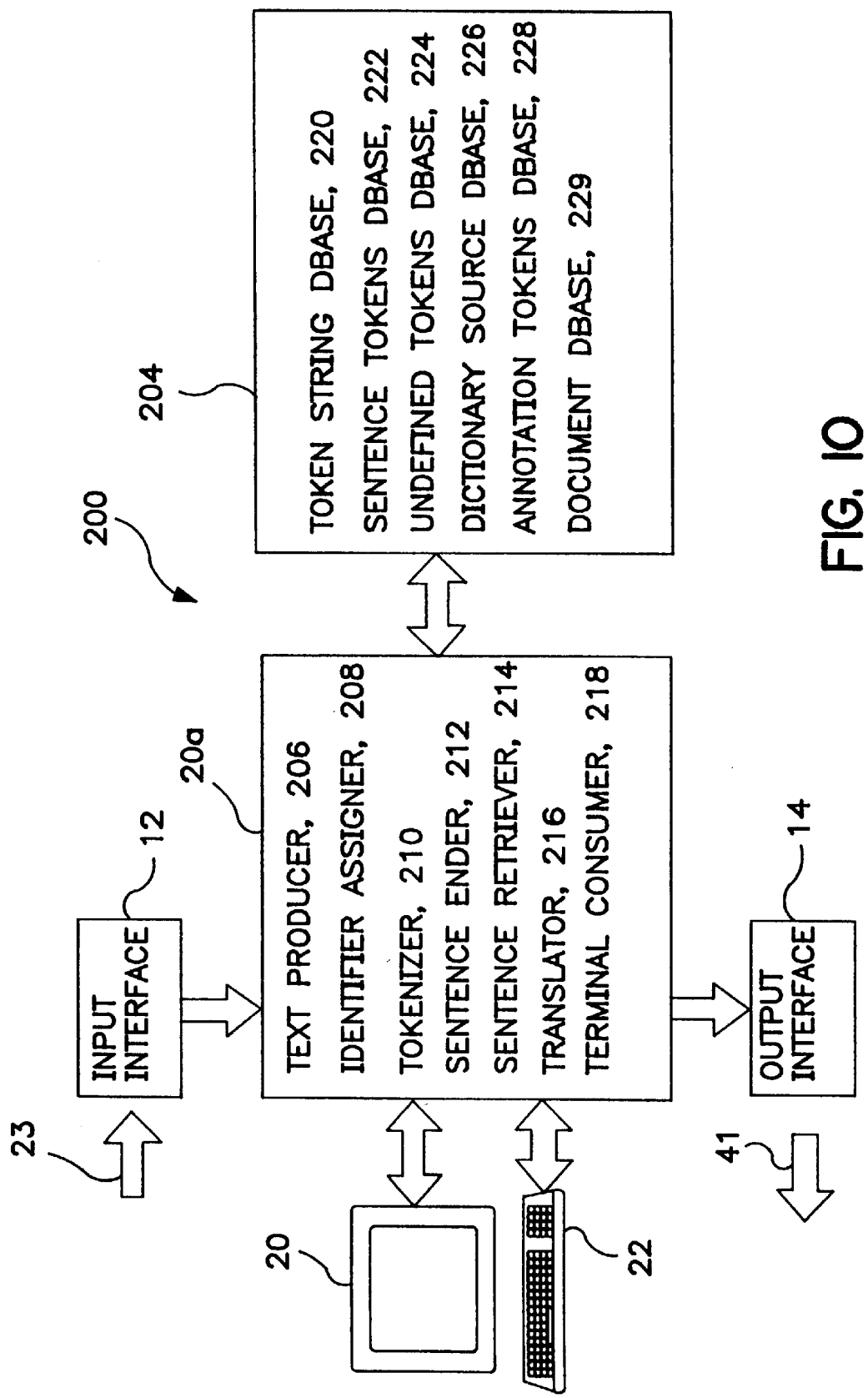
FIG. 10 is a block diagram illustrating a system for performing automated translation of natural language and preservation of annotations in text, according to one embodiment of the invention.

Referring to FIG. 10, shown is an embodiment of the automated natural language translation system 200 for translating text while preserving annotations in the text. In the present embodiment, the system can be used to translate a source document having an English language text to a Japanese or Spanish language text, where the source document includes annotations, such as, part-of-speech settings, HTML, SGML markup, RTF markup and NROFF. As similarly shown in FIG. 1, the system 210 includes an input interface 12, a translation engine 202, a storage module 204, a user input device 22, and an output interface 14. The components and functions of such elements as described in FIG. 1 for performing a translation of a text in a source language are performed by the translation engine 202. To eliminate redundancy however, such elements and functions are not shown or reiterated herein. As shown in this figure, the translation engine 202 includes a text producer 206, which receives through the input interface 12 an input data string comprising the source text. The text producer 206 divides the input data string into a token string that includes byte tokens and annotation tokens. The text producer 206 further includes an identifier assignor 208 which gives each of the tokens a unique token identifier, such as a number or character, that is used by the system 200 to track each token in the storage module 204, as well as define relationships between the tokens. Each byte token has a particular field that provides the token type (i.e. annotation token, byte token) and the token identifier. This field to used to track the token in the token string and link the token to other tokens. The translation engine 202 further includes a tokenizer that consumes the byte tokens and creates word tokens that correspond to words in the source text in the first language. For example, in a translation from English annotated text to Japanese annotated text, the word tokens are tokens that represent byte tokens that have been converted to English words tokens. Note that in the present embodiment, only the byte tokens are converted, the annotation tokens remain unchanged.

The translation engine 202 farther includes a sentence ender 212 that determines where sentence endings exist in the source document and inserts end-of-sentence tokens into the token string, and a sentence retriever 214 that initiates storage of the tokens in each sentence and aids in the recreation of a sentence of source text by subsequently retrieving these tokens from the storage module 204. The translation engine 202 further includes a translator 216 for performing removal of the annotation tokens, initiation of storage of the identifiers assigned to the annotation tokens, initiation of storage of identifiers assigned to the undefined tokens, conversion of the word tokens from a first language to a second language, cross-referencing word tokens from a first language to a second language in a dictionary source database 226, and assignment of new identifiers to the word tokens in the second language. The translation engine 202 further comprises a terminal consumer 218 that inserts the annotation tokens and other tokens, such as the undefined tokens, into appropriate locations in a target document in the second language.

As shown, the storage module 204 can include a token string database 220, a sentence tokens database 222, an undefined tokens database 224, a dictionary source database 226 and an annotation tokens database 228. In the present embodiment, the undefined tokens database 224 is used to store undefined tokens or data relating to undefined tokens, such as, for example, the assigned token identifiers, each of which can act as a pointer to identify the location of an undefined token in the storage module 204. Similarly, the dictionary source database 226 is used to store and cross-reference word tokens in a first language with word tokens in a translated or second language. In the present embodiment, identifiers can also be stored to cross-reference the word tokens in the different languages in the dictionary source database 226. The annotation database 228 is used to store annotation tokens or, as described with respect to the other databases 224, 226, the identifiers assigned to the annotation tokens can be stored to identify the location of the annotation tokens in the storage module 204, and the relationships therebetween.

The present embodiment is useful with annotations that are used by the translator 218, as well as those that are not used by the translator 218, but are useful for further processing of the text after translation. For example, tokens that represents part-of-speech settings are absorbed by the translator 218 during translation. Token identifiers associated with such annotation tokens or the word tokens are saved in the databases, 220, 222, 224, 226, 228, 229 to aid in subsequent retrieval of the annotation tokens for further text processing or refinement. It should be noted that the databases, 220, 222, 224, 226, 228, 229 do not follow strict database standards, but simply save information about the tokens that can be accessed by the token identifier or other locator.

Figure 11:
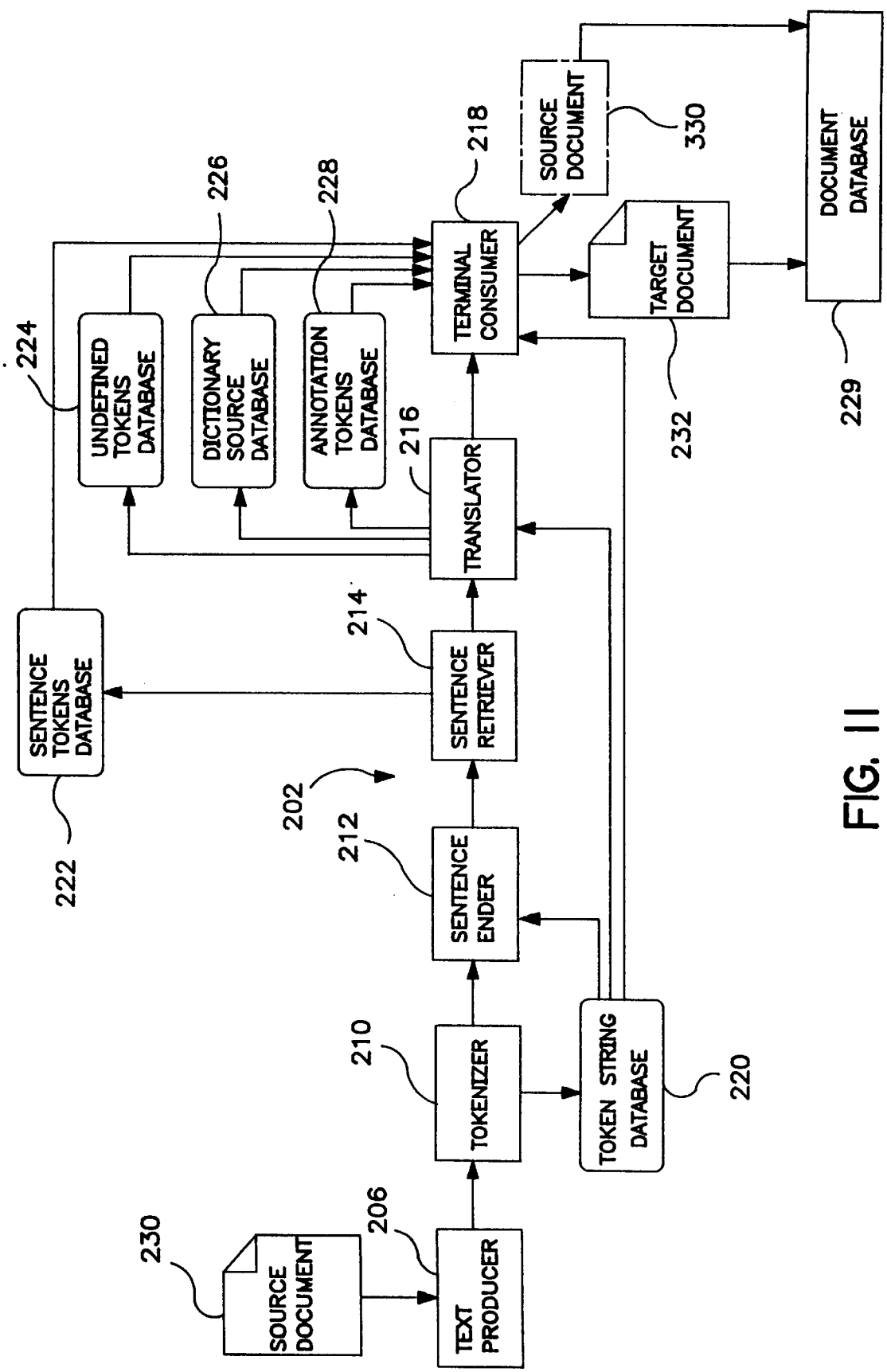
FIG. 11 is a block diagram illustrating the flow of a token string through the system for performing automated translation of natural language and preservation of annotations in text, according to the embodiment of FIG. 10.

Referring to FIG. 11, shown is a block diagram illustrating, in one embodiment, the flow of a token string through the system 200 for performing automated translation and preservation of annotations in text according to FIG. 10. As shown in this figure, a source document 230 is converted to a data string and transmitted from the text producer 20 to the tokenizer 210, at which point the token string is formed and stored in the token string database 220. The token string is then transmitted to the sentence ender 212 which inserts appropriate tokens in the token string representing the end of the sentence or section. These tokens are hereinafter referred to as end-of-sentence tokens. The token string is then transmitted to the sentence retriever 214, which ensures that all the tokens in each sentence or section are linked on a sentence-by-sentence basis in the sentence tokens database 222. The token string is then passed to the translator 216 where a translation is performed and first language word tokens are transformed into second language word tokens. Tokens that are not understood by the translator 216 are passed through without being translated or otherwise changed. Such tokens are considered undefined word tokens, and the tokens or their identifiers can then be stored in the optional undefined tokens database 224. Additionally, the first language and second language word tokens or their identifiers are cross-referenced and stored in the dictionary source database 226, and the annotation tokens or their identifiers are stored in the annotation tokens database 228. The token string is then passed to the terminal consumer 218 which receives the second language word tokens and uses the token identifiers stored in the token string database 220 to ensure that second language word tokens are properly disposed in the string. The terminal consumer then transforms the second language word tokens into byte tokens and creates the target document 232.

In the present embodiment, the target document 232 can comprise a non-annotated translation of the source document 230. The target document 232 is then stored in the document database 229 with the original source document 230. As the token string database is typically cleared for each translation performed, such as, each time a sentence in the source document is translated, or, alternatively, each time an entire source document has been translated, the source document 232 is recreated by the terminal consumer 218 and stored in the document database 229 for later use by the translation engine 202. The terminal consumer 218 can further use the undefined tokens database 224 to provide the user, in an interactive environment, with a list of the words that were in the source document 230 for which no translation has been given. The flow of a token string through the system of FIG. 11 is driven by repeatedly calling the terminal consumer 218 until it receives a token that represents the end-of-file. An end-of-file token can indicate that the end of the source text 230 has been reached, or that the end of a selected section of source text 230 that is being translated, has been reached.

As described above, the terminal consumer, using the data in the dictionary source database 224, the undefined tokens database 224 and the annotations database 228, can further recreate the original source document 230, to aid in further processing of the target document 232 or the source document 230. The source document 230 and the target document 232 can thus be stored in the document database 229. By reconstructing the source document 230 with the original annotations preserved in appropriate locations therein, the translation engine 202 can more easily determine the parts-of-speech appropriate for each word in subsequent translations of the target document 232 or in subsequent translations of the source document 230. As will be further described in FIG. 18, subsequent processing can entail further refinement of the text of the source document 230, such as, for example, when a high level translation is desired through the use of synonyms of common words. Such processing can occur after the target document 232 is created, thus making knowledge of the placement of the annotations in the original source document 230 a useful tool.

Figure 13:
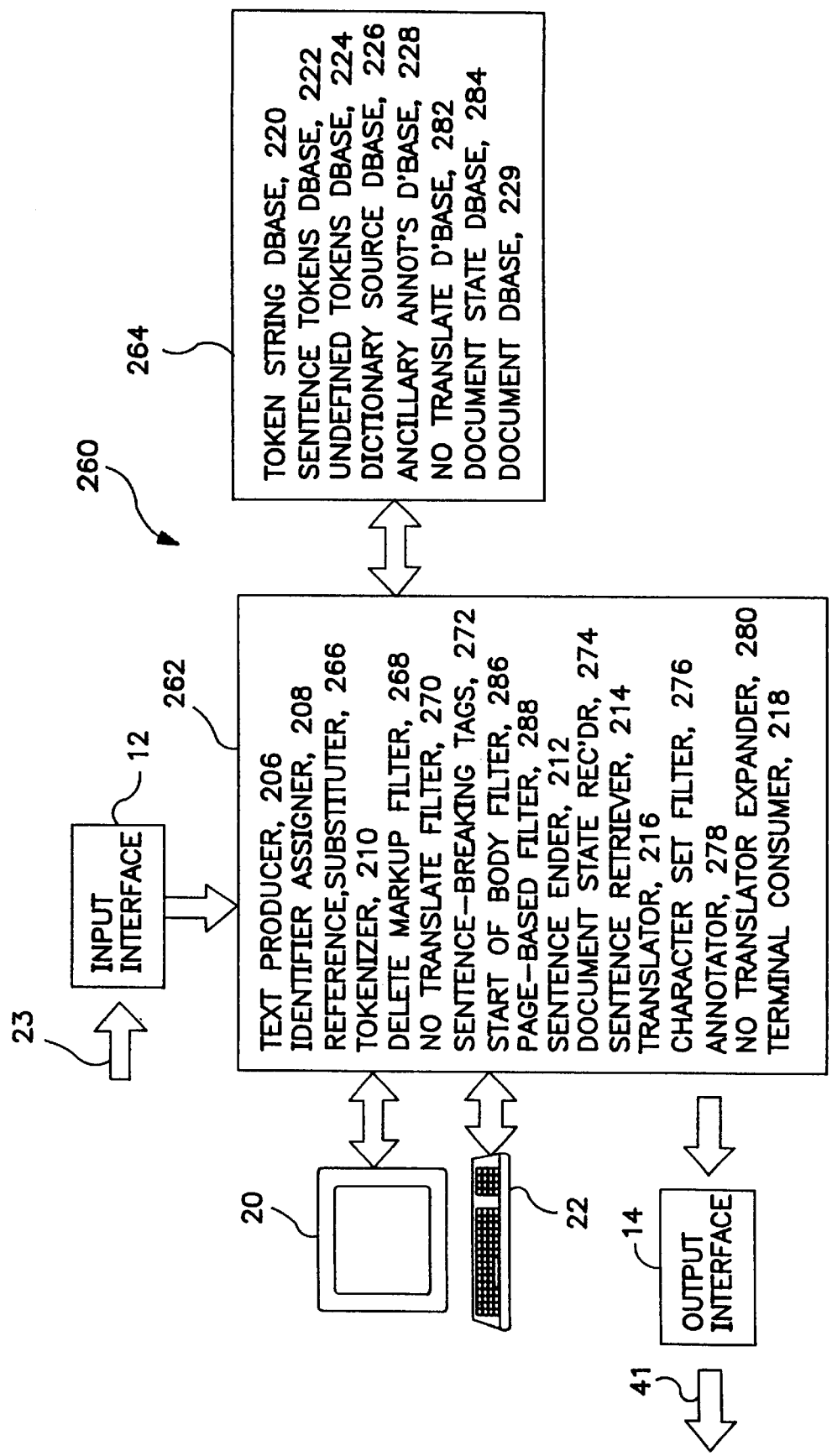
FIG. 13 is a block diagram illustrating a system for performing automated translation of natural language and preservation of annotations in text, particularly HTML markup, according to another embodiment of the invention.

In the embodiment further described in FIG. 13 and successive figures, the annotation tokens database 228 can cooperate with an annotator to insert the annotation tokens at appropriate locations in the target document 224. In such an embodiment, the target document 232 is a translated version of the source document 230 and includes in the proper locations, the annotations present in the original text of the source document 230.

Figure 12:
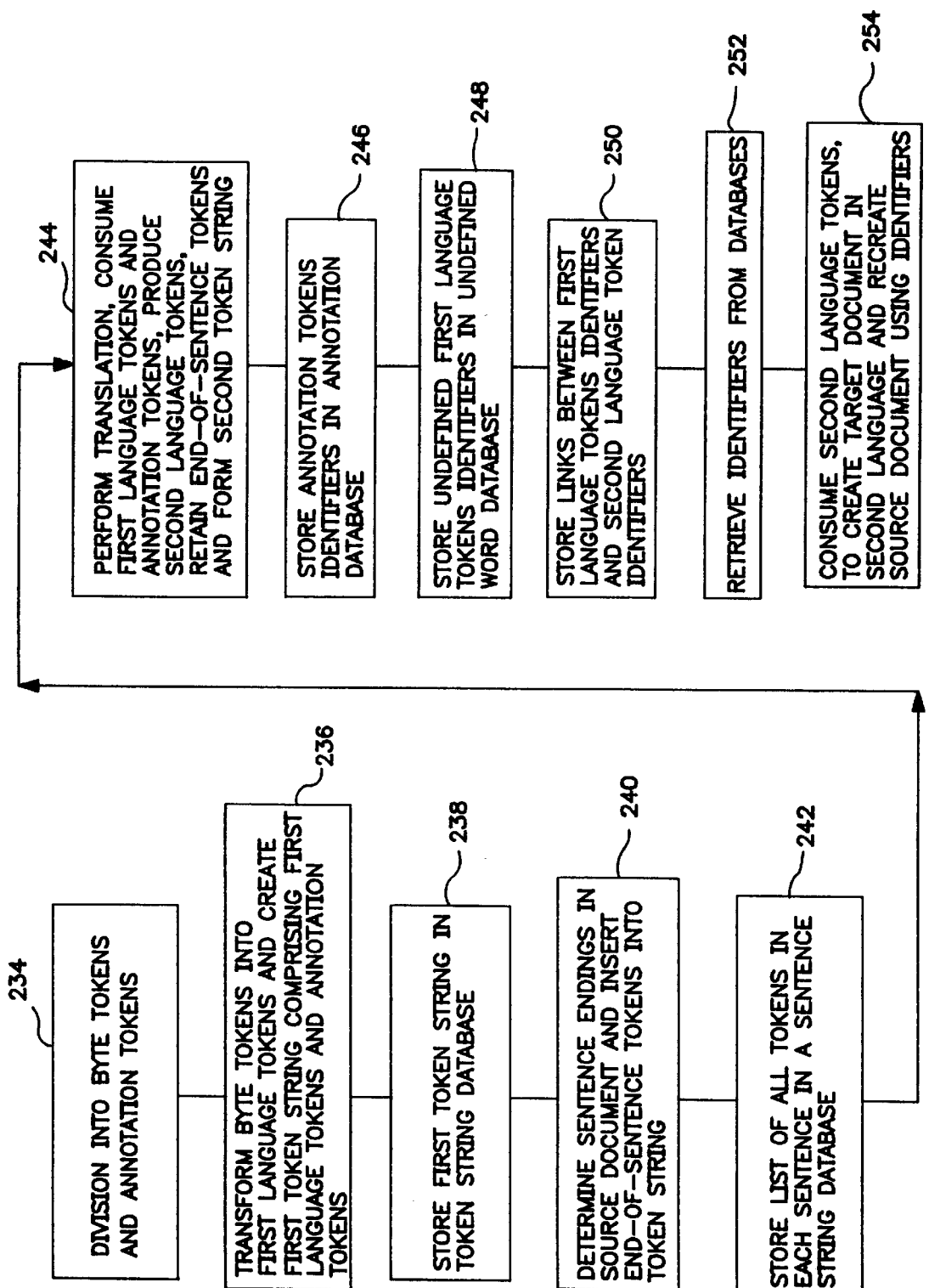
FIG. 12 is a flow diagram illustrating the annotation preservation operations of the system of FIG. 11.

Referring to FIG. 12, shown is a flow diagram illustrating the annotation preservation operations of the system of FIG. 11. Referring to step 234, the source document data string is divided into byte tokens and annotation tokens. For example, consider a source document including the sentence, "The boy ran to the store." With part-of-speech annotations, this sentence would appear as:

"The <noun> boy <end-noun><verb> ran <end-verb> <prepositional phrase> to the store <end-prepositional-phrase>."

The text producer 206 separates or parses the part-of-speech settings such as <noun > <end-noun> <verb >, etc., from the words, such that the words take the form of byte tokens and the part-of-speech settings take the form of annotation tokens. The byte tokens and annotation tokens are then passed to the tokenizer 210, similar to the preparser described above, which, in step 236, transforms the byte tokens into first language word tokens. Like the above-described preparser, it recognizes special constructions (e.g., internet addresses, telephone numbers, and social security numbers) as single units, and can also use a dictionary lookup in the storage module 204 to find groupings.

The tokenizer 210 thus creates a token string comprising word tokens and annotation tokens. The token string is then stored in the token string database 220 in step 238, and passed to the sentence ender 212 which determines, in step 240, where the end-of-sentence tokens should be inserted in the token string, and inserts such tokens into the token string. The locations where the end-of-sentence tokens are inserted, can be determined according to the flow chart of FIG. 5. In step 242, the sentence retriever 214 then stores a list of the identifiers of all tokens in each sentence in the sentence tokens database 222. This database 222 can later be used by the terminal consumer 232 to recreate the original sentence in the translated, second language, and to obtain information about the sentence as it existed in the first language to improve the accuracy of the placement of translated words when creating sentences in the second language.

The token string is then passed to the translator 216 which, in step 244, consumes the first language and annotation tokens, separates the annotation tokens from the token string, and translates the word tokens in a first language to word tokens in a second language. The word tokens in the second language form a second token string, and the second language tokens are assigned new identifiers. The end-of-sentence tokens are the only tokens in the original token string that are not processed by the translator 216. The end-of-sentence tokens are thus retained after translation and act as pointers to the annotation token identifiers and undefined word identifiers stored in the databases 224, 228 in the storage module 204. In step 246, the annotation token identifiers are stored in the annotation database 228, and are indexed or cross-referenced with the identifiers assigned to the end-of-sentence tokens. Should subsequent processing of the target document 232 be needed, the end-of-sentence tokens can act as links to the corresponding annotations, particularly, part-of-speech settings, to ensure that the words in the target document continue to be placed correctly in subsequent translations. Additionally, as described above, the source document 230 can be recreated by the terminal consumer 218 with the aid of the end-of-sentence tokens providing links to the first language word tokens and annotation tokens stored in the dictionary source database 226 and the annotation tokens database 228.

Referring to step 248, in performing the translation, certain word tokens will not be known by the translator 214, and as a result, translation of such word tokens will not take place. For example, a word such as, "lazerize" can not be translated by the translator 214, and is considered an undefined word token. In the present embodiment, the translator 214 creates second language word tokens that contain the undefined words in the undefined word tokens, and stores the undefined word tokens or identifiers associated therewith in the undefined tokens database 224. The undefined tokens database 224 can subsequently be accessed by the terminal consumer to provide the user with a list of words that the translator did not translate. Using the example above, the word "lazerize" can be transmitted to the user's terminal along with other words that were considered undefined. As similarly described above, the undefined word tokens or identifiers associated therewith can be indexed or cross-referenced with the identifiers associated with the end-of-sentence tokens.

During translation, word tokens in a first language are transformed into word tokens in second language, and new identifiers are assigned to such new word tokens. In step 250, the translator 216 links, indexes, or cross-references, in the dictionary source database 226, the identifiers assigned to the first language word tokens with the identifiers assigned to the second language word tokens. Such linking or cross-referencing can be carried out by linking the identifiers associated with the first and second word tokens with the identifiers associated with the end-of-sentence tokens.

The second token string comprising the second language tokens is then passed to the terminal consumer 218 where the target document comprising a translation of the source document into a second language is created. In step 252, the end-of-sentence tokens in the second token string are used to retrieve token identifiers from the sentence tokens database 222, the annotation tokens database 228, the dictionary source database 226 and in certain instances, the undefined tokens database 224. In step 254, the second language tokens are processed by the terminal consumer and the target document 232 is created. The sentence tokens database 222 further provides to the terminal consumer 218 information relating to the word tokens and annotation tokens that are present in each sentence of the source document 230, such that the source document 230 can be recreated and stored as described above. Similarly, the dictionary source database 226 can link the second language word tokens with the first language word tokens to ensure that the placement of the second language word tokens with the annotation tokens in the second token string makes sense in the target document 232.

Referring to FIG. 13, shown is an alternative embodiment of a system 260 for the automated translation of natural language and preservation of annotations, particularly HTML markup. The discussion herein is to be considered illustrative, rather than restrictive, and it is to be appreciated that this discussion applies to text that includes part-of-speech annotations, SGML markup, RTF markup and NROFF markup. Elements in the system of the present embodiment that have been shown and described in connection with FIG. 1 and FIG. 10 are incorporated herein, and to eliminate redundancy, a discussion of such elements is not reiterated. As described above, HTML markup exists in certain text as information for designating, for example, section headings, lists and tables. As shown, the translation engine 262 includes a reference substituter 266 which examines the annotation tokens in the token string to determine if they comprise HTML markup, and whether the markup comprises HTML character references. HTML character references are a feature of HTML that encodes a special character with a sequence of other characters. If the reference substituter 266 detects a character entity reference, it replaces the character entity reference with the appropriate character. For example, if an HTML document includes the following HTML characters:

4<5 to represent that "four is less than five," the reference substituter will replace the character entity reference such that the HTML tag reads:

4<5 which are characters that the translation engine 262 can understand.

As further shown, the translation engine 262 includes a delete markup filter 268 that deletes certain HTML tokens that are not to be preserved during translation. For example, certain HTML markup may render unclear the second language of the target document when applied to certain words in the second language. Such markup can include font selection, bolding, italics or underlining. Generally more important HTML markup such as, indenting and headers are retained. When the translation engine 262 determines that markup should not be preserved, the markup can be deleted from the token string in the delete markup filter 268.

The system further determines whether surrounding tokens should be merged after such markup is deleted. For example, certain HTML markup implies white space, that is, the HTML markup suggests that a space exists between the text existing on either side of the markup. When the HTML markup suggests the existence of white space, such as a line-break tag <BR>, deletion of the token representing the markup does not affect the translation because the adjacent text remains separately disposed. For example, if the sentence "Come see our <BR> new products" appears in text, the resulting translation maintains "our" and "new" appear as separate tokens rather than joining them into one as "ournew." However, when the HTML tag to be deleted is embedded in a word in the text, the word can become fragmented. To eliminate inaccuracies in translation, the delete markup filter further determines when an HTML tag to be deleted appears within a word in the text. After the HTML tag is deleted, the delete markup filter merges the surrounding text.

The translation engine 262 further includes a 'no translate' filter 270 that removes all tokens in the token string that should not be translated, and generates no-translate tokens to act as place holders in the locations where the tokens have been removed from the token string. For example, the tag <PRE> indicates that the tokens following it should not be translated. Such tokens often comprise computer code, tabular data or other text for which translation is not required. The translation engine 262 further includes a sentence breaking tags filter 272 to determine locations in the text where HTML markup implicitly ends a sentence or a section, as similarly described above. For HTML markup that implies the ending of a section, such as an end of top-level heading, e.g. </H1>, an end-of-sentence token is inserted.

The translation engine 262 can further include a start-of-body filter 286 to determine a start of HTML body token, that is, <BODY>. This tag is placed in the text to distinguish the body of the text from the header of the text. In the event that such a token is not found at the appropriate location in the source text, the start-of-body filter 286 can insert an HTML body token. This filter 286 can cooperate with the sentence breaking tags filter 272 to identify the end of sentence tags that 'close' the section above the body and insert in such locations a start of HTML body token the start-of-body tag. Similarly, the translation engine 262 can include a page-based filter 288 to determine when a start of HTML body token is seen, and insert a page-based button when an internet page is being translated. The start-of-body filter 286 and the page-based filter 288 can further aid in the addition of user-friendly features to the target document. Such features can include the addition of text, for example, to indicate that the document viewed by the reader of a webpage was translated from English, or the addition of a 'button' or icon to enable the viewer to return to a original home-page or section. As such features are to be visible to the reader, they must be placed in the BODY section of the document, therefore a determination of the start of the BODY can be a useful tool to the translation engine 262.

Similarly, a filter can be used to determine the existence of an alternate image HTML tag, <IMG>. This tag typically appears on a website that includes images. In the event that the image is not shown, the tag precedes the text that tells the viewer what the image should be. In the system of the present invention, an optional alternate image filter (not shown) can be used to determine the existence of this tag in the source document, create word tokens for translating the text and process the HTML markup as described above. In this manner, the viewer of a website that is translated into Spanish, for example, can determine what an image represents when the image is not present in the source document.

A document state recorder 274 determines which tokens in a token string are HTML markup and further determines the first language tokens to which each HTME markup applies. The document state recorder 274 creates an annotation record for each token in the token string. The annotation records link the HTML markup with the first language tokens such that for each first language token, a determination can be made of the HTML markup that applies thereto. As will be further described, the annotation records are useful in determining where corresponding markup should be placed in the translated version of the source document.

The translation engine 262 further includes a translator 216 as described above, for transforming the first language tokens into second language tokens. After translation, the character set filter 276 scans the translation tokens and any character that would be illegal in HTML, such as "<" or "&", is replaced with the character entity reference to which it corresponds, that is considered legal in HTML. The annotator 278 determines the locations where HTML tokens should be inserted into the token string and inserts such tokens into the token string at appropriate locations, as described in greater detail herein in FIG. 17. The 'no translate' expander 280 determines which tokens were labeled 'no translate', retrieves the corresponding tokens that were initially removed from the token string and reintroduces such tokens into the token string at the locations of the 'no translate' tokens. The terminal consumer 218, as described above, receives the token string comprising the second language tokens, HTML tokens and other annotation tokens such as part-of-speech tokens, and generates the target document 232 in the second language.

As similarly described above, the storage module 264 includes a token string database 220, a sentence tokens database 222, an undefined tokens database 224, a dictionary source database 226, and an ancillary annotation tokens database 228 in which non-HTML annotation tokens or their identifiers are stored. As further shown, the storage module 264 includes a no-translate database 282 where tokens that are not to be translated or the identifiers associated therewith are stored. Additionally, the storage module 264 includes a document state database 284 in which the annotation records are stored.

Figure 14:
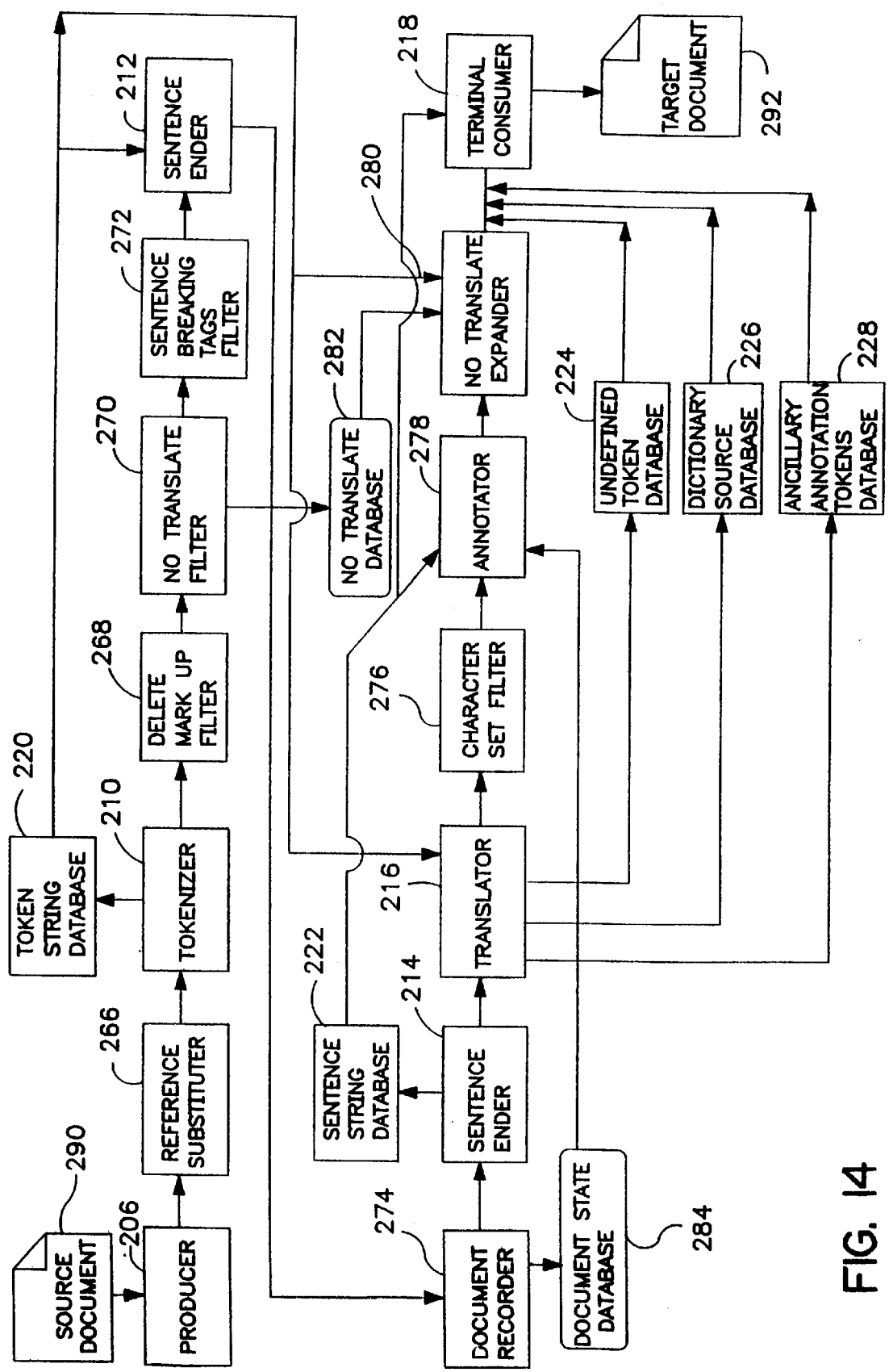
FIG. 14 is a block diagram illustrating in another embodiment, the flow of a token string through the system of FIG. 13 for performing automated translation and preservation of annotations in text.

Referring to FIG. 14, shown is a block diagram illustrating an embodiment of a system 260 for performing automated translation and preservation of annotations, in a source document having HTML, SGML, RTF or NROFF markup. For purposes of illustration only, a source document having HTML markup is described herein. As shown, a source document 290 having HTML markup is converted to a data string and transmitted to the text producer 206, the reference substituter 266 and the tokenizer 210, where the token string is created and stored in a token string database 220. The token string is transmitted to the delete mark-up filter 268, which deletes certain mark-up that should not be preserved through translation. A no translate filter 270 removes all the tokens in the token string that should not be translated, stores the removed tokens in a no-translate database 282, and inserts into the token string a 'don't translate' token where the removed tokens originally appeared.

The token string is then transmitted to the sentence breaking tags filter 272 and the sentence ender 212, both of which insert end-of-sentence tokens in the token string. The token string is then transmitted to the document state recorder 274 which determines which tokens are HTML markup and records these tokens in the document state database 284, as further described. The document state database 284 records the annotation records representing the markup state for the first language tokens in the first token string, that is, the annotations that apply to the first language words on the original source document 230. As will be further described, the document state database 284 is later used to recreate the markup state of the first token string for use in building a matching markup state for a second token string that includes translated or second language word tokens.

The token string is then passed to the sentence retriever 214 which ensures that a list of the tokens in each sentence are stored together in the sentence tokens database 222 for ease of subsequent retrieval and sentence reconstruction. The token string is then passed to the translator 216 where the HTML tokens are removed and a translation is performed on the remaining tokens in the token string to produce a second token string. After translation, the character set filter 276 inspects each token for characters that would be considered illegal in HTML, such as "&" and "<", and replaces them with the appropriate HTML character entity references. The annotator 278 retrieves information from the document state database 284 and inserts the HTML tokens into the second token string at appropriate locations with respect to the translated tokens, as further described. The second token string is then transmitted to the no-translate expander 280 which receives the no-translate tokens and replaces such tokens with the word tokens that they represent as retrieved from the 'no translate' database 282. The token string is then passed to the terminal consumer 218 which creates the target document 292 and inserts any ancillary annotation tokens, such as part-of-speech tokens at appropriate locations in the target document 292. The target document 292 is a translated version of the source document 290 containing the translations, HTML markup and other annotations present in the original source document 290.

Figure 15:
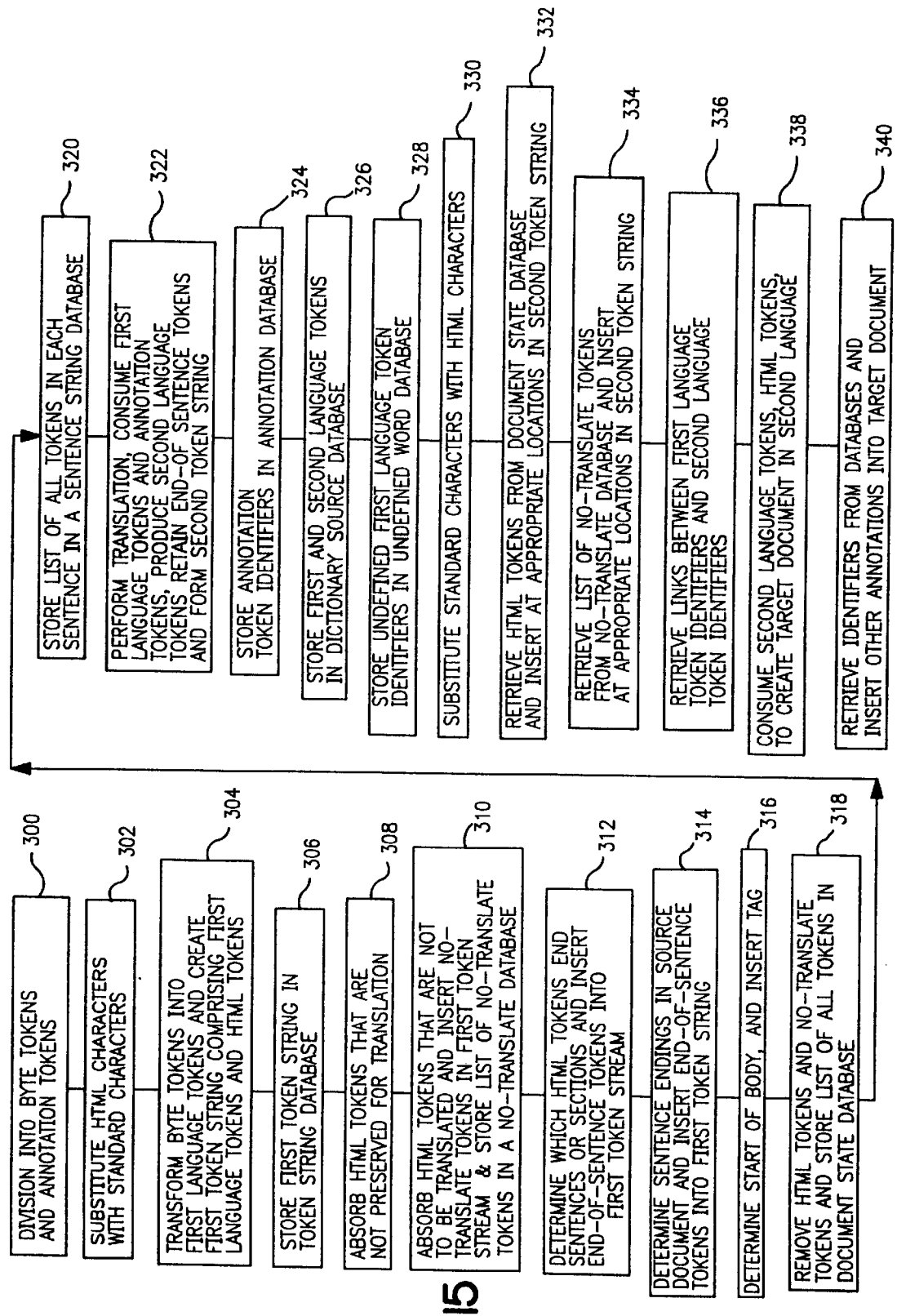
FIG. 15 is a flow diagram illustrating the annotation preservation operations of the system of FIG. 13.

Referring to FIG. 15 shown is a flow diagram illustrating the annotation preservation operations of the system of FIG. 13. Referring to step 300, the source document data string is divided into byte tokens and annotation tokens, some of which are HTML tokens. For example, the following sentence in a source document:

"Changing the oil every 1000 miles is necessary."

can appear as:

<BOLD>C<FONT size=−1>hanging the oil every 1000 miles is necessary.<BOLD>

Thus, the tokens for this sentence can be represented in a string as: HTML token, byte token, HTML token, byte token, byte token, . . . HTML token. As similarly described above, annotations representing part-of-speech settings are also separated by the text producer from byte tokens and appear as annotation tokens, as described above in FIG. 12. To eliminate redundancy, the description above relating to part-of-speech annotations although not reiterated, is incorporated herein.

In step 302, certain HTML character entity references appearing in HTML tokens that cannot be processed by the translator are replaced with characters. After the reference substituter has replaced the character entity references with characters, the byte tokens are transformed into first language tokens as described above, and a first token string is created in step 304. The first token string comprises the first language tokens, the HTML tokens and any additional non-HTML annotation tokens. In step 306, the token string is then stored in a token string database, as similarly described above.

In step 308 the token string is further examined for HTML tokens that should not be carried though to the translated target document 232 and such tokens are removed from the token string by the delete markup filter 268. The token string is next passed through the 'no translate' filter in step 310 where first language tokens which are not to be translated are absorbed by the system and replaced by 'no translate' tokens. For example, when a user is browsing over multiple internet pages and only wishes to translate the header or footer of the page, the translation engine 262 receives such an indication through the input device so that the word tokens corresponding to the text between the header and footer are replaced with a plurality of no-translate tokens. In this manner, the 'no translate' tokens in the token string will remain unchanged as the token string is received by the translator 216. The first language tokens that are not to be translated are then saved in the no-translate database 282 and indexed by the identifiers assigned to the 'no-translate' tokens that replace the first language tokens in the token string.

The token string is then examined in step 312, to determine the locations at which HTML tokens end sentences or form an ending to a section. As described above, sentence endings can be determined in the source text according to the flow chart of FIG. 5. A such locations, an end-of-sentence token is inserted into the token string to ensure that the preceding tokens can be indexed together in the sentence tokens database 222 as shown in step 314. Additionally in step 316, start-of-body tokens can be inserted where the start-of-body filter 286 in the translation engine 262 determines that a start-of-body HTML tag should exist. As described above, such start-of-body tags are often missing in between the header and the body of the text and are thus inserted at such locations.

In step 318, the HTML tokens are removed from the token string by the document state recorder 274. As the HTML tokens cannot be translated, they must be removed from the token string to enable the translation engine 262 to translate the word tokens in the token string. Upon removal of the HTML tokens from the token string, each HTML token is stored in the document state database 284 and linked to the word token(s) to which it applies. Given that HTML markup often applies to multiple sentences or paragraphs in the source text, the document state recorder 274 saves the HTML tokens across the document, that is, the HTML tokens are saved in a plurality of vectors to which other annotation tokens and non-annotation tokens are linked, as further described in FIG. 16. The length of the vectors are not dependent on sentence structure, but rather on the applicability of the HTML markup in the source text to surrounding words.

The vectors are stored in the document state database 284 as annotation records that represent the order of the word tokens and the HTML tokens in the source document 290, and specify for each word token, the HTML tokens that apply to each word token. In this manner, locating in a document state database 284, an annotation record for a particular word token also locates the HTML markup that applies to that word token. The annotation record for each token comprises a token field that includes the token identifier and the token type, and an offset to the parent annotation record. The parent annotation record identifies the HTML token that applies to the word token. The offset to the parent token identifies the spatial relationship between the HTML markup and the word token.

For example, an annotation record can appear as follows:

Annotation Record (Token the Token, size_t parentOffset):t(the-Token), parent(parentoffset), where Token t: // the source token AnnotationRecord*parent//pointer to the enclosing annotation As shown, the annotation record includes the token of interest and the parent token, that is, the token that 'encloses' the token of interest. The parent token is the closest markup to the token of interest, the markup that is first encountered when looking at the relationship between the token of interest and other tokens. It is important to note that the parent token or closest markup may also be markup that itself is enclosed by other markup, that is, the parent token may itself have a parent token. Thus, an annotation record comprises a link between a token of interest and all the markups that apply to that token. The parent offset thus acts as a pointer to another annotation record, as the parent offset points to the annotation record created for the parent token.

As described above in step 318, the HTML tokens are removed and the annotation records are created for the first language word tokens in the first token string and stored in the document state database. In step 320 a list of all tokens in each sentence is stored in a sentence tokens database 222. In step 322 the translation is performed and the first language word tokens and remaining annotation tokens are consumed and the second language word tokens are created to form a second token string. In step 324, the annotation token identifiers are stored in the ancillary annotation tokens database 228 and in step 326, the first language word tokens are cross-referenced with the second language tokens and stored in the dictionary source database 226. In step 328, the undefined first language token identifiers are stored in the undefined tokens database 224. In step 330 the original HTML characters replace the character entity references in the HTML tokens. In step 332 the HTML tokens are retrieved from the document state database and are inserted at appropriate locations in the second token string. The process by which this step is carried out is further illustrated in FIG. 16 and FIG. 17.

As described above, during translation, the first language word tokens are consumed and the only tokens that remain intact are the end-of-sentence tokens. The identifiers assigned to the end-of-sentence tokens are thus used to link or cross-reference in the dictionary source database 226, the first language tokens with the second language tokens to enable the system to determine which first language words correspond with which second language words. After translation has occurred and the word tokens are second language word tokens, the vectors that are used to determine the locations of HTML markup in text can be generated by first retrieving from the dictionary source database 226, the links between the second language word tokens and the first language word tokens. Once a correspondence between the second language word tokens and the first language word tokens is determined, the identifiers for the first language word tokens are known and can be used to locate the annotation records for the tokens of interest in the document state database 284. For example, upon locating a first language word that corresponds to a second language word, the enclosing markup for the first language word can be determined and similarly applied to the second language word. Once the annotation records are obtained, the vector as shown and described in FIG. 16, can be created and used to aid the annotator 278 in placing the annotations in the second token string with the second language word tokens.

Figure 16:
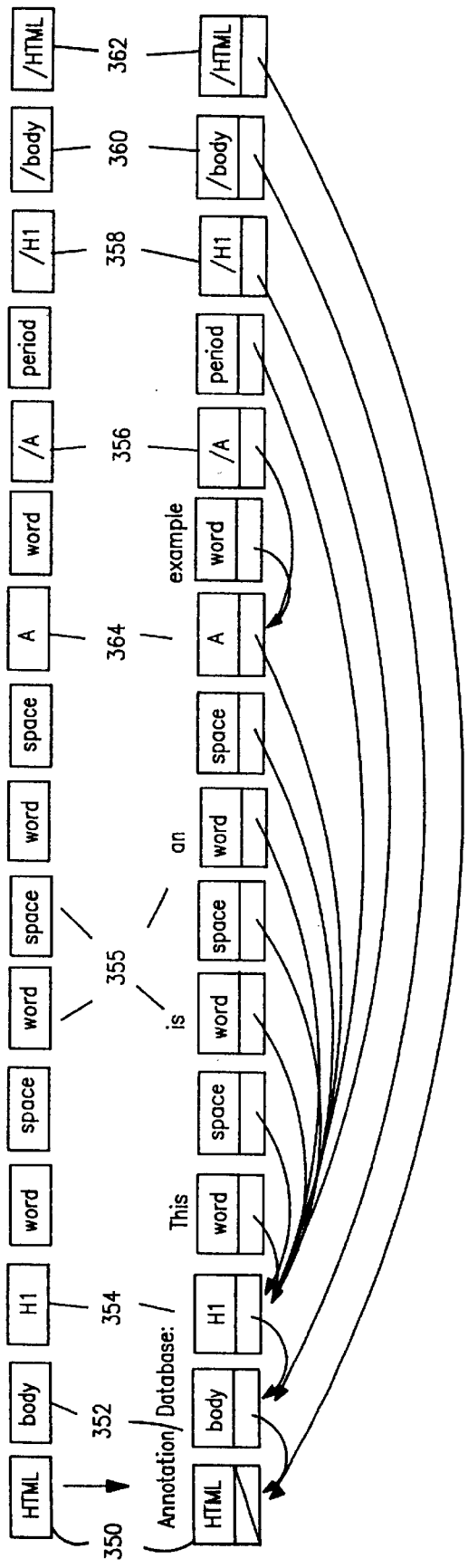
FIG. 16 is a diagram illustrating an example of an annotation record stored in memory.

Referring FIG. 16, shown is an example of a vector linking annotation tokens and non-annotation tokens for a sentence in the source text. The sentence includes the following words:

"This is an example.", which include the following HTML markup:

<HTML><BODY><H1>This is an <A HREF="a.html">example</A>.</H1></BODY></HTML>

As shown in this figure, the tokens produced by the tokenizer divide the elements of the sentence into annotation tokens, particularly HTML tokens, and word tokens, thereby forming a token string. When the token string reaches the document state recorder 274, the left-most token 350, which, in this example is the HTML token, will be received first. The HTML token becomes the first token in the vector, such that any subsequent token, whether it is an annotation token or a non-annotation token, is linked to the list of annotation records in the document state database 284. The next token is an HTML token 352 <BODY> specifying 'start-of-body', and is linked to the HTML token. Similarly the next token 354 is an HTML token "H1" and is also a start annotation token, which is linked to the preceding 'start-of-body' token. The tokens 355 that follow this token represent words and spaces, and are linked to the last HTML annotation token 354 in the vector, that is, the "H1" token. Upon receipt of the next HTML token "A" 356, representing the HTML markup <A HREF="a html">, the document state recorder links this token to the last HTML token 354. As this HTML token 356 is also a start token, the next token received, a word token, is linked to the HTML token "A". The next token 358 received is an ad ending token that represents the HTML markup </A>, and closes the previous "A" HTML token. As an ending token, this token 358 is linked to the "A" token. The next token 360 is also an ending token, and represents the HTML markup </H1>. This token ends the previously received "H1" token 354 and is thus linked thereto. Similarly, the HTML markup </BODY> and </HTML> are ending tokens 362, 364 that are linked respectively to the start tokens 350, 352, representing "body" and "html". Thus, with each token received, the vector is increased, and links between tokens are created. Moreover, locating one word token in the vector points to enclosing markup and other word tokens.

Referring again to FIG. 15, step 332, the annotator refers to the annotation records of each token of interest and inserts annotation tokens in the second token string at corresponding locations deemed applicable based on the links provided between annotation records. Referring again to the example in FIG. 16, in a translation from English to Japanese, the translation of the English word tokens corresponding to "This is an example.", appear as Japanese word tokens in a second token string. The annotator refers to the vector associated with the English word tokens and determines that the following tags applied to the first language word tokens, and therefore will apply to the corresponding Japanese words: HTML, BODY, H1, A, /HTML, /BODY, /H1 and /A. These tokens are then inserted in the second token string which is updated and stored in the storage module. As further described in FIG. 17, the tokens in the second token string reflecting the newly inserted HTML tokens are then subtracted from the tokens in the first token string that correspond to the vector, to determine the HTML tokens that were present in the first token string but have not yet been inserted into the second token string.

Figure 17:
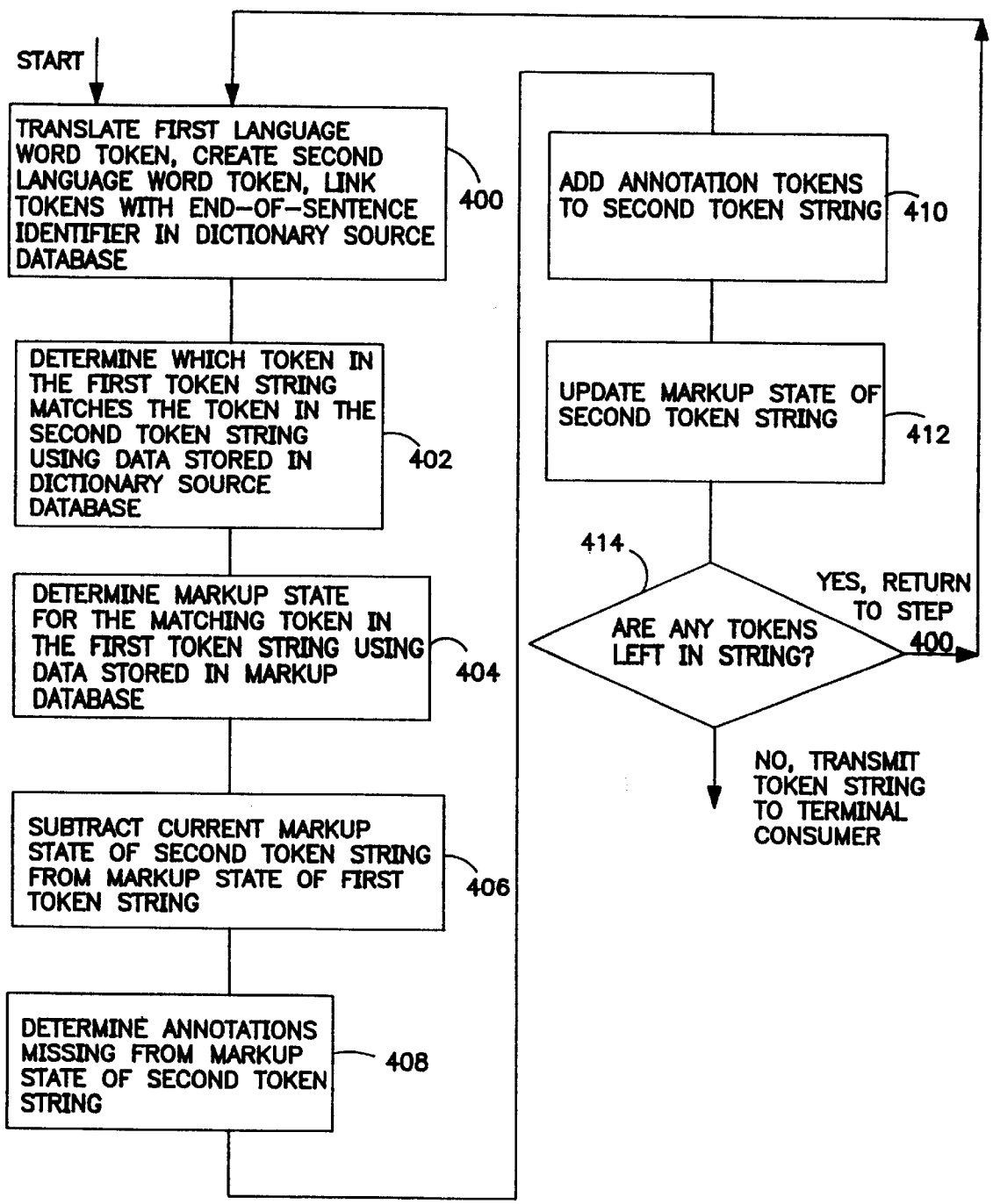
FIG. 17 is a flow diagram illustrating the insertion of annotations into proper locations in a translated token string.

Referring to FIG. 17, shown is a flow diagram illustrating the insertion of annotations into proper locations in a translated token string such that the current markup state for the second language tokens matches the markup state of the first language word tokens. Referring to step 400, the first language word token is translated to a second language word token. The first language word token is further linked to the second language word token in the dictionary source database by an end-of-sentence token. In step 402, the annotator determines which token in the first token string corresponds to the second language token for which a matching markup state is desired. In making this determination, the annotator obtains from the sentence database, the identifier assigned to the end-of-sentence token for the sentence in which the token exists, The end-of-sentence token identifier is then used to locate, in the dictionary source database, the token identifier that corresponds to the first language word token. Upon locating the token identifier for the corresponding first language token, the annotation record in the document state database can be determined for that token as described above.

The annotator then retrieves in step 404, the annotation record from the document state database and generates a list of annotations that encompasses the first language token as described in FIG. 16. As described above, the markup state for a token of interest is the list of tokens that represent the annotations that are open at that token's position in the vector. Referring again to the sentence "This is an example.", shown with HTML markup as:

<HTML><BODY><H1>This is an <A HREF="a.html">example</A>.</H1><BODY><HTML> the markup state for the token representing "This" is [<HTML><BODY><H1>]. This markup state further applies to "is an" and ".". The word "example" however, has a different markup state, which is [<HTML><BODY><H1><A HREF="a.html">]. As the vector provides the annotator with the current markup state for the first language token, the annotator, in step 406, subtracts the markup state of the second language token from the markup state of the first language token. Control then passes to step 408, and a determination is made as to which annotation tokens are missing from the current markup state of the second language word token. This process is repeated with successive tokens in the second token string. Thus, after the sentence "This is an example." is translated and represented by a second language token string, the annotation tokens that are added to the second language token string are subtracted from the above-described annotations to determine the additional annotation tokens that are needed for insertion into the string.

By retrieving the annotation records, the annotator can determine for a word token, the markup that applies thereto, and insert the markup at the appropriate location in the target document, notwithstanding any dislocation of the word token from word tokens that may have been adjacent in the source document. In some instances, to ensure that the markup of the second language string is correct, the annotations are inserted more than once into the translation.

It is important to note that the current markup state for a second language word token depends only upon the markup previously inserted into the second language string and may not include all of the markup for the first language word token. Thus, the subtraction of the markup state of the second language token from the markup state of the first language word token will yield a list of tokens that are required to make the second language markup state match the first language markup state. Those tokens are the 'missing annotation tokens' that must be inserted into the second token string around the particular second language token to build a matching markup state. Referring to steps 410 and 412, such annotation tokens can then be inserted into the second token string surrounding the second language token, and the current markup state of the second token string can be updated and saved in the storage module. Control then passes to step 414, and the annotator determines if there are any second language word tokens left in the second token string. If additional second language word tokens remain, control returns to step 400, and the second language word token's corresponding first language token is determined, and steps 402 through 414 are again executed with the current markup state reflecting the previously inserted annotation tokens. If however, an end-of-file token immediately follows the previously received second language word token, the annotator determines that all the applicable annotations have been inserted into the second token string and control is passed to the terminal consumer. As described above, when the second token string reaches the terminal consumer, it is processed and converted into the target document in the second language.

The present invention can be used to translate an entire document or merely a portion of a document. Where only a portion of the document is being translated, the annotation records are created for each token in the document. The first language tokens, however, are not translated until the token that commences the desired portion for translation is reached. In this manner, the markup state for the entire document is current, thus ensuring that the markup state for the token that commences the desired portion for translation is current as well.

Referring again to FIG. 15, once the annotations have been inserted in the second token string in step 332,, control is routed to step 334 where a list of 'no translate' tokens are received by the terminal consumer and the list of 'no-translate' tokens are provided to the user. In step 336 the links between the first language tokens and the second language tokens are retrieved. In step 338, the second language tokens and HTML tokens in the second token string are consumed and the target document is generated in the second language. In step 340, the annotations such as part-of-speech settings, are inserted into the target document using the links provided by the dictionary source database 226.

Figure 18:
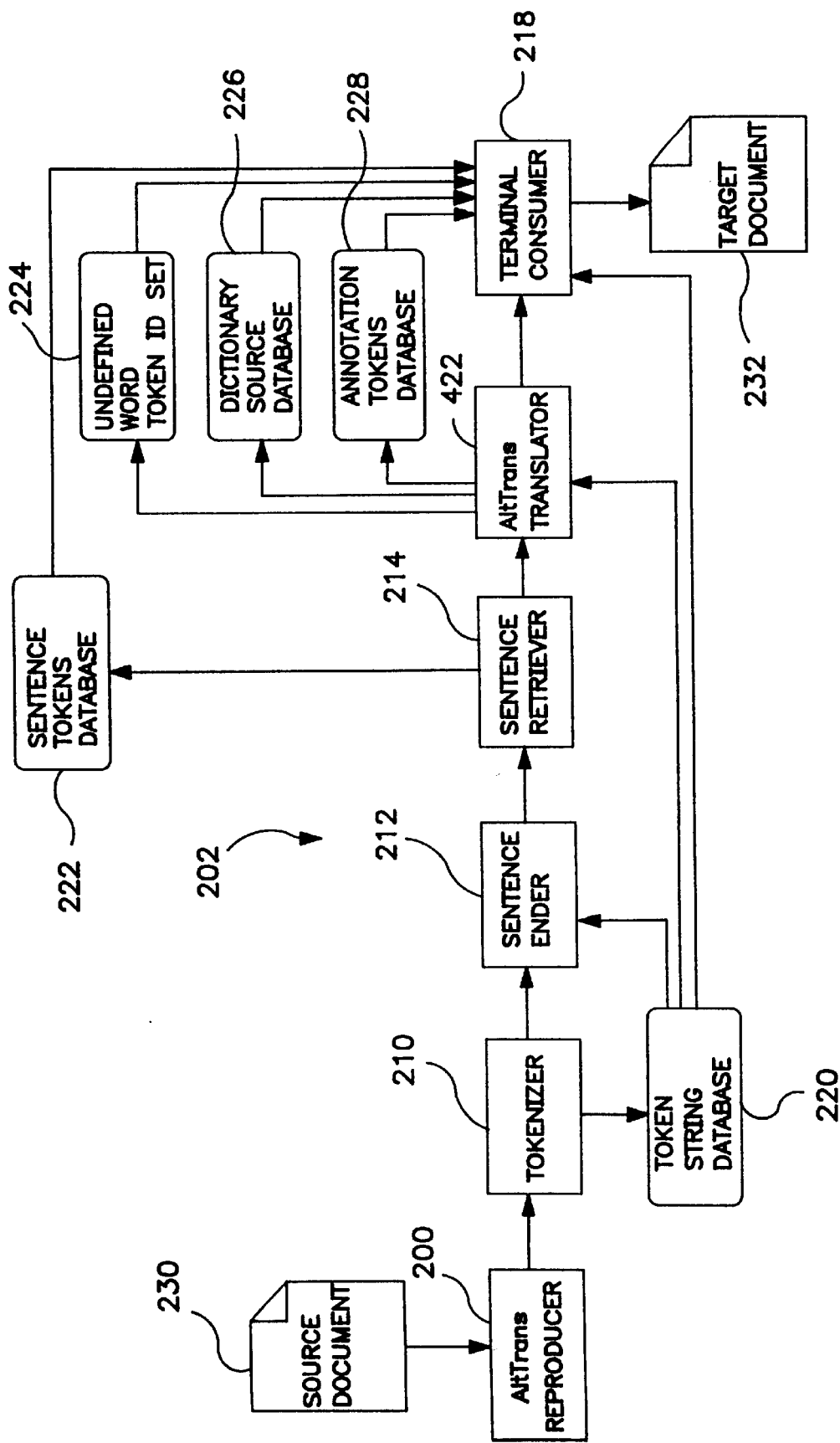
FIG. 18 is a block diagram illustrating in another embodiment, the flow of a token string through the system for performing automated translation of natural language and preservation of annotations in text, in which a user can select from translation alternatives.

Referring to FIG. 18, shown is a block diagram illustrating the flow of a token string through the system for performing automated translation of natural language and preservation of annotations in edited text. This embodiment of the invention is similar to the embodiment shown and described above in connection with FIG. 11, and to eliminate redundancy, some of the elements previously shown and described above are incorporated, but not reiterated, herein.

In the present embodiment, a source document 230 is transmitted as a data stream to an alternate text producer 420. The alternate text producer 420 can receive and interpret commands entered by a user through the input device 22, and can modify the translation process accordingly. For example, the alternate text producer 420 can receive an input indicating that the user changed or modified the text in a document to be translated. Such edits to the text within the source document, are then stored in the storage module 204. The alternate text producer 420 can thus access the storage module 204 to create tokens that correspond to the changed or modified text and transmit such tokens to the tokenizer 210. As the alternate text producer 420 creates tokens that correspond to the edited text, any tokens previously created for the original text that preceded the edits, can be deleted. Annotation records are then created for each of the tokens representing the edited text, and these annotation records are linked to existing annotation records, as described above in FIG. 16. Thus, the current markup state for the edited text of the document can be obtained, such that the resulting target document can include a translation of the edited text along with the surrounding text in the source document, while including the markup that applies thereto.

The token string is then transmitted to the sentence ender 212, which inserts appropriate tokens representing the end of the sentence, and then to the sentence retriever 214, which ensures that the tokens in each sentence are stored together in the sentence tokens database 222. As similarly described above, end-of-sentence tokens representing sentence endings in the original text are replaced by end-of-sentence tokens representing endings in the edited text in the sentence tokens database 222. In this manner, the tokens stored in the sentence tokens database 222 represent the sentences in the source document, including any sentences that have been edited.

The token string is then passed to the alternate translator 422 where a translation is performed. As described above, annotation tokens are removed and such tokens or their identifiers are sent to appropriate databases, such as the undefined tokens database 224, the dictionary source database 226, and the annotation tokens database 228. In the present embodiment, the alternate translator 422 provides a plurality of translation options from which the user can select. For example, the user can select a certain phrase or text in a source document and provide an indication to the translator 422 that the phrase or text is to be repeatedly refined during translation. In this example, a plurality of alternate translations can be provided to the user and the user can select which translation best applies to the phrase or text. Similarly, a user can select a word or phrase from the target document that the user would like to be further refined.

The token string is then passed to the terminal consumer 218 which inserts the annotation tokens at appropriate locations in the target document 232. The target document 232 is a translated version of the source document comprising the translation and annotations present in the original source text along with any changes or modifications that have been made to the source text, as well as any refinements that have been made to the translated text. Thus, the system of the present embodiment can provide a target document comprising an enhanced translation of the source document. It is important to note that the alternate text producer 420 and alternate translator 422 can further be used in the system described in FIG. 14, and can replace the text producer and translator shown and described therein. Therefore, the system of FIG. 14 for preserving HTML markup can allow the user to edit or change text during translation and can provide the user with a number of translation options, as described above.

Any of the embodiments of the automated natural language translation system described herein, including all of the functionality described herein, can be provided as computer software on a computer-readable medium such as a diskette or an optical compact disc (CD) for execution on a general purpose computer (e.g., an Apple Macintosh, an IBM PC or compatible, a Sun Workstation, etc.).

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for translating an annotated source document in a first language to an annotated source document in a second language, comprising:

receiving a source document in a first language, the source document comprising a plurality of sentences, the sentences having text and annotations;

creating a first token string using the source document, the first token string comprising a plurality of first language tokens and a plurality of annotation tokens;

inserting a plurality of end-of-sentence tokens into the token string at locations corresponding to sentence endings in the source document;

removing the plurality of annotation tokens from the token string;

storing the removed annotation tokens in a storage module and linking the annotation tokens to the end-of-sentence tokens in the storage module;

translating the plurality of first language tokens and creating a second token string comprising a plurality of second language tokens and the end-of-sentence tokens;

determining locations for inserting each of the plurality of annotation tokens in the second token string using the end-of-sentence tokens; and inserting the plurality of annotation tokens into the second token string at the locations; and producing a translated version of the source document in the second language using the plurality of second language tokens and the annotation tokens in the second token string.

2. The method of claim 1, wherein the annotation tokens represent one or more of the following: part-of-speech settings, HTML markup, SGML markup, RTF markup, and NROFF markup.

3. The method of claim 1, wherein the first language tokens represent English text and the second language tokens represent Japanese text.

4. The method of claim 1, wherein the first language tokens represent English text and the second language tokens represent Spanish text.

5. The method of claim 1, further comprising:

storing in a sentence database corresponding to the order of appearance in a sentence in the source document, the plurality of first language tokens, the annotations tokens and the end-of-sentence tokens; and using the tokens stored in the sentence database to determine the locations for inserting the annotation tokens into the second token string.

6. The method of claim 1, further comprising:

determining which of the first language tokens in the first language token string are undefined first language tokens;

storing the undefined first language tokens in the storage module; and providing a list of undefined first language tokens to the viewer of the translated version of the source document.

7. The method of claim 1, further comprising:

storing the first language tokens in the storage module;

storing the second language tokens in the storage module; and using the end-of-sentence tokens to link the stored first language tokens with the stored second language tokens.

8. The method of claim 1, further comprising:

determining the end of the source document, creating an end-of-file token, and inserting the end-of-file token in the first token string.

9. The method of claim 1, wherein the annotation tokens comprise HTML tokens representing HTML character entity references.

10. The method of claim 9, the step of creating a first token string further comprising:

determining a substitute character for a character entity reference in at least one HTML token; and replacing the character entity reference with the substitute character.

11. The method of claim 9, further comprising:

determining which of the HTML tokens comprise non-translatable HTML markup characters; and removing from the first token string, the HTML tokens comprising non-translatable HTML markup characters.

12. The method of claim 9, further comprising:

storing the plurality of HTML tokens in a document state database; and creating a vector linking each of the plurality of HTML tokens with each of the plurality of the first language tokens.

13. The method of claim 12, further comprising:

inserting the HTML tokens into the second token string using the vector.

14. The method of claim 9, wherein the text further comprises text that alternately replaces an image in the source document.

15. The method of claim 1, further comprising:

determining a location in the source document between a beginning of the source document and an ending of the source document;

translating the first token string from the location; and producing a partially translated version of the source document.

16. A system for translating an annotated source document in a first language, to an annotated target document in a second language while preserving annotations from the source document to the target document, comprising:

a receiving module for receiving a source document in a first language, the source document comprising text and annotations;

a processing module for creating a first token string comprising a plurality of first language tokens, a plurality of annotation tokens, and a plurality of ending tokens corresponding to discontinuities in the text of the source document; and a translation engine for removing the plurality of annotation tokens from the first token string, translating the plurality of first language tokens to a plurality of second language tokens in a second token string; using the plurality of ending tokens to insert the annotation tokens into the second token string, and creating a target document comprising a translated version of the source document using the second token string; and a storage module comprising an annotation database for storing the annotation tokens, wherein the annotation tokens are linked to the ending tokens.

17. The system of claim 16, the storage module further comprising:

a dictionary source database for storing the first language tokens and the second language tokens, wherein the ending tokens provide links between the first language tokens and the second language tokens in the dictionary source database, and an undefined words database for storing undefined first language tokens, wherein the ending tokens provide links to the undefined first language tokens in the undefined words database.

18. The system of claim 17, wherein the translation engine accesses the markup database and compares the second token string with HTML markup linked to the first language tokens in the markup database to determine locations in the second token string where the HTML tokens should be inserted.

19. The system of claim 16, wherein the processing module creates HTML tokens representing HTML markup in the source document.

20. The system of claim 19, wherein the annotation database comprises a markup database for linking each first language token in the first token string to the HTML tokens that apply thereto.

21. A method for translating an HTML annotated source document in a first language to a target document in a second language having corresponding HTML markup, comprising:

receiving a source document in a first language, the source document comprising a plurality of sentences, the sentences having text and HTML markup;

creating a first token string using the source document, the first token string comprising a plurality of first language tokens and a plurality of HTML tokens that apply to the first language tokens;

removing the HTML tokens from the first token string;

creating a plurality of annotation records for the first language tokens, each annotation record linking one of the first language tokens to each of the HTML tokens that apply to the first language token;

storing the annotation records in a document state database;

translating the plurality of first language tokens and creating a second token string comprising a plurality of second language tokens; and determining at which locations in the second token string the HTML tokens should be inserted using the annotation records; and producing a target document in the second language using the second token string.

22. The method of claim 21, further comprising:

determining whether any of the HTML tokens in the first token string comprise character entity references; and substituting characters for the character entity references.

23. The method of claim 21, further comprising:

determining whether any of the HTML tokens should not be preserved in the second token string; and deleting from the first token string, the HTML tokens that should not be preserved.

24. The method of claim 21, further comprising:

determining whether any of the tokens in the first token string should not be translated;

removing the tokens that should not be translated from the first token string;

storing the removed tokens; and inserting marker tokens into the first token string in the locations where the tokens were removed.

25. The method of claim 21, further comprising:

determining whether the HTML tokens represent a discontinuity in the source text;

inserting into the first token string, ending tokens representing the discontinuity; and storing in a database indexed by the ending token, the tokens in the first token string up to the discontinuity.

26. The system of claim 21, wherein the first language tokens represent English text and the second language tokens represent Japanese text.

27. The system of claim 21, wherein the first language tokens represent English text and the second language tokens represent Spanish text.

28. An automated natural language translation system, comprising:

computer storage means;

means for receiving input textual information in a first language and for storing the input textual information in the computer storage means, the input textual information including annotations; and a translation engine for accessing the computer storage means and for translating the input textual information in the first language into output textual information in a second language, the translation engine comprising: (i) a tokenizer for creating a first token string using the source document, the first token string comprising a plurality of first language tokens and a plurality of annotation tokens that apply to the first language tokens, (ii) a filter for removing a subset of the annotation tokens from the first token string, (iii) a document state recorder for creating a plurality of annotation records for the first language tokens, each annotation record linking one of the first language tokens to each of the annotation tokens that apply to the first language token, (iv) a translator for translating the plurality of first language tokens and creating a second token string comprising a plurality of second language tokens, (v) an annotator for determining at which locations in the second token string the annotation tokens should be inserted using the annotation records, and (vi) a terminal consumer for producing a target document in the second language using the second token string.

29. The system of claim 28, wherein the annotations comprise HTML markup, SGML markup, RTF markup or NROFF markup.

30. The system of claim 28, wherein the first language tokens represent English text and the second language tokens represent Japanese text.

31. The system of claim 28, wherein the first language tokens represent English text and the second language tokens represent Spanish text.

32. The system of claim 28, wherein the translation engine further comprises:

means for receiving a user input; and an alternate translator for processing an input from a user and providing translation options to the user.

33. The system of claim 32, further comprising an alternate text producer for receiving a source document and an input from a user and transmitting the source document and the input to the tokenizer.

34. The system of claim 33, wherein the input from a user comprises edits to the source document.

35. The system of claim 34, wherein the plurality of first language tokens created by the tokenizer comprise first language tokens representing the edits to the source document.

* * * * *